US012009600B1

(12) United States Patent
Jensen

(10) Patent No.: US 12,009,600 B1
(45) Date of Patent: Jun. 11, 2024

(54) BROADBAND ANTENNA STRUCTURE AND ASSOCIATED DEVICES

(71) Applicant: FIRST RF Corporation, Boulder, CO (US)

(72) Inventor: Anthony J. Jensen, Thornton, CO (US)

(73) Assignee: FIRST RF Corporation, Boulder, CO (US)

( * ) Notice: Subject to any disclaimer, the term of this patent is extended or adjusted under 35 U.S.C. 154(b) by 24 days.

(21) Appl. No.: 17/835,811

(22) Filed: Jun. 8, 2022

(51) Int. Cl.

| | |
|---|---|
| ***H01Q 21/26*** | (2006.01) |
| ***H01Q 9/16*** | (2006.01) |
| ***H01Q 9/42*** | (2006.01) |
| ***H01Q 13/08*** | (2006.01) |
| ***H01Q 19/10*** | (2006.01) |

(52) U.S. Cl.
CPC ............... *H01Q 21/26* (2013.01); *H01Q 9/16* (2013.01); *H01Q 9/42* (2013.01); *H01Q 13/085* (2013.01); *H01Q 19/104* (2013.01)

(58) Field of Classification Search
CPC .................................................... H01Q 21/064
USPC .......................................................... 343/797
See application file for complete search history.

(56) References Cited

U.S. PATENT DOCUMENTS

| | | | | |
|---|---|---|---|---|
| 2,559,693 | A | 7/1951 | Willoughby | |
| 4,500,887 | A | 2/1985 | Nester | |
| 4,843,403 | A | 6/1989 | Lalezari et al. | |
| 6,225,957 | B1 * | 5/2001 | Yamaguchi ........ | H01Q 15/0033 343/781 P |
| 6,552,691 | B2 | 4/2003 | Mohuchy et al. | |
| 8,427,373 | B2 * | 4/2013 | Jiang .................... | H01Q 9/0407 343/846 |
| 9,142,889 | B2 * | 9/2015 | Pazin .................. | H01Q 13/106 |
| 9,257,748 | B1 | 2/2016 | Lalezari et al. | |
| 9,397,404 | B1 | 7/2016 | McDevitt et al. | |
| 10,218,087 | B2 * | 2/2019 | Hartenstein ............ | H01Q 21/30 |
| 10,910,692 | B2 * | 2/2021 | Furlan .................. | H01Q 1/3233 |
| 2016/0344104 | A1 * | 11/2016 | Junttila ................ | H01Q 13/085 |

(Continued)

FOREIGN PATENT DOCUMENTS

KR 101883605 B1 * 9/2017 ............... H01Q 9/27

OTHER PUBLICATIONS

Ghazali, I. et al."3D Printed Metalized-Polymer UWB High-Gain Vivaldi Antennas" Conference Paper May 2016; 5 pages.

(Continued)

*Primary Examiner* — Hoang V Nguyen
*Assistant Examiner* — Brandon Sean Woods
(74) *Attorney, Agent, or Firm* — COZEN O'CONNOR

(57) ABSTRACT

An antenna includes two radiators that are co-planar and exhibit mirror symmetry about an axis. Each radiator includes a half-Vivaldi sub-radiator bounded by a first curved edge and a first straight edge adjacent to the first curved edge. Each radiator also includes a curved monopole sub-radiator that is bounded by a second curved edge and a second straight edge adjacent to the second curved edge. The first and second straight edges coincide such that the first and second curved edges are continuous. When the antenna is driven at relatively high frequencies, the half-Vivaldi sub-radiators cooperate to act like a planar Vivaldi antenna. At lower frequencies, the curved monopole sub-radiators cooperate to act like a planar dipole antenna. Two of these antennas may be fabricated on circuit boards that intersect to form a dual-polarization antenna system.

38 Claims, 16 Drawing Sheets

(56) References Cited

U.S. PATENT DOCUMENTS

| | | | | |
|---|---|---|---|---|
| 2018/0013203 | A1* | 1/2018 | Wangsvick | H01Q 21/205 |
| 2019/0260131 | A1* | 8/2019 | Cohen | H01Q 21/064 |
| 2020/0161774 | A1* | 5/2020 | Carlson | H01Q 13/085 |
| 2021/0320405 | A1* | 10/2021 | Wu | H01P 5/12 |
| 2023/0143858 | A1* | 5/2023 | Gunnels | H01Q 21/26<br>343/770 |

OTHER PUBLICATIONS

Shin, J. et al. "A Parameter Study of Stripline-Fed Vivaldi Notch-Antenna Arrays" IEE Transactions on Antenna and Propagation, vol. 47, No. 5, May 1999; pp. 879-886.

Lewis, L.R. et al. "A Broadband Stripline Array Element" Jun. 1974 Antennas and Propagation Society International Symposium' pp. 335-337.

Bhattacharjee, A. et al. "Vivaldi antennas: a historical review and current state of art", International Journal of Microwave and Wireless Technologies; Cambridge University Press: Oct. 21, 2020 18 pages.

* cited by examiner

BROADBAND ANTENNA STRUCTURE AND ASSOCIATED DEVICES

BACKGROUND

A Vivaldi antenna, or tapered slot antenna, is one type of non-resonant traveling-wave antenna that can achieve a much higher bandwidth than many types of resonant antennas. For example, some Vivaldi antennas can achieve bandwidths as high as 10:1.

SUMMARY

Disclosed herein is a broadband antenna structure that combines a Vivaldi-like sub-radiator structure with a monopole-antenna-like sub-radiator structure. In one embodiment, an antenna radiator includes a half-Vivaldi sub-radiator bounded by a first curved edge and a first straight edge that is adjacent to the first curved edge. The antenna radiator also includes a curved monopole sub-radiator that is bounded by a second curved edge and a second straight edge that is adjacent to the second curved edge. The second straight edge has a second length that is less than a first length of the first straight edge. The first and second straight edges coincide such that the first and second curved edges are continuous. The sub-radiators may be co-planar, e.g., fabricated from one piece of metal or fabricated on the same layer of a printed circuit board.

In another embodiment, an antenna includes first and second radiators that exhibit mirror symmetry about a symmetry axis. Each of these radiators is an instance of the antenna radiator described above. The radiators are co-planar and positioned with their curved edges facing each other. The region between these curved edges is electrically non-conductive, thereby forming a tapered slot that also exhibits mirror symmetry about the symmetry axis. The width of the tapered slot, as measured transversely to the symmetry axis, increases along the symmetry axis.

When the antenna is electrically driven at relatively high frequencies, the two half-Vivaldi sub-radiators cooperate to act like an equivalent planar Vivaldi antenna. Operation of the antenna in this manner is referred to herein as "Vivaldi mode". When the antenna is electrically driven at lower frequencies, the half-Vivaldi sub-radiators conduct the drive signal to the curved monopole sub-radiators. These curved monopole sub-radiators cooperate to act like an equivalent planar dipole antenna that emits radiation at frequencies lower than what the equivalent planar Vivaldi antenna can emit. Operation in this manner is referred to herein as "dipole mode".

Advantageously, the antenna of the present embodiments is physically smaller than a conventional Vivaldi antenna that is large enough to radiate over the same frequency range. As a result, the present embodiments may be used for the same applications as conventional Vivaldi antennas, but with a form factor that is better suited for limited spaces and tight volumes.

In another embodiment, a dual-polarization antenna system includes a first antenna and a second antenna that intersects the first antenna. Each of the first and second antennas is an instance of the antenna described above. The symmetry axes of these first and second antennas coincide, thereby establishing a common symmetry axis for the antenna system. The first and second antenna may be orthogonal to each other. In one embodiment, each of these first and second antennas is fabricated on a circuit board. A slit may be cut into each of these circuit boards so that they can inserted into each other. In another embodiment, a cavity formed from electrically conductive material at least partially encircles an upper portion of the two circuit boards.

DETAILED DESCRIPTION

Figure 1:
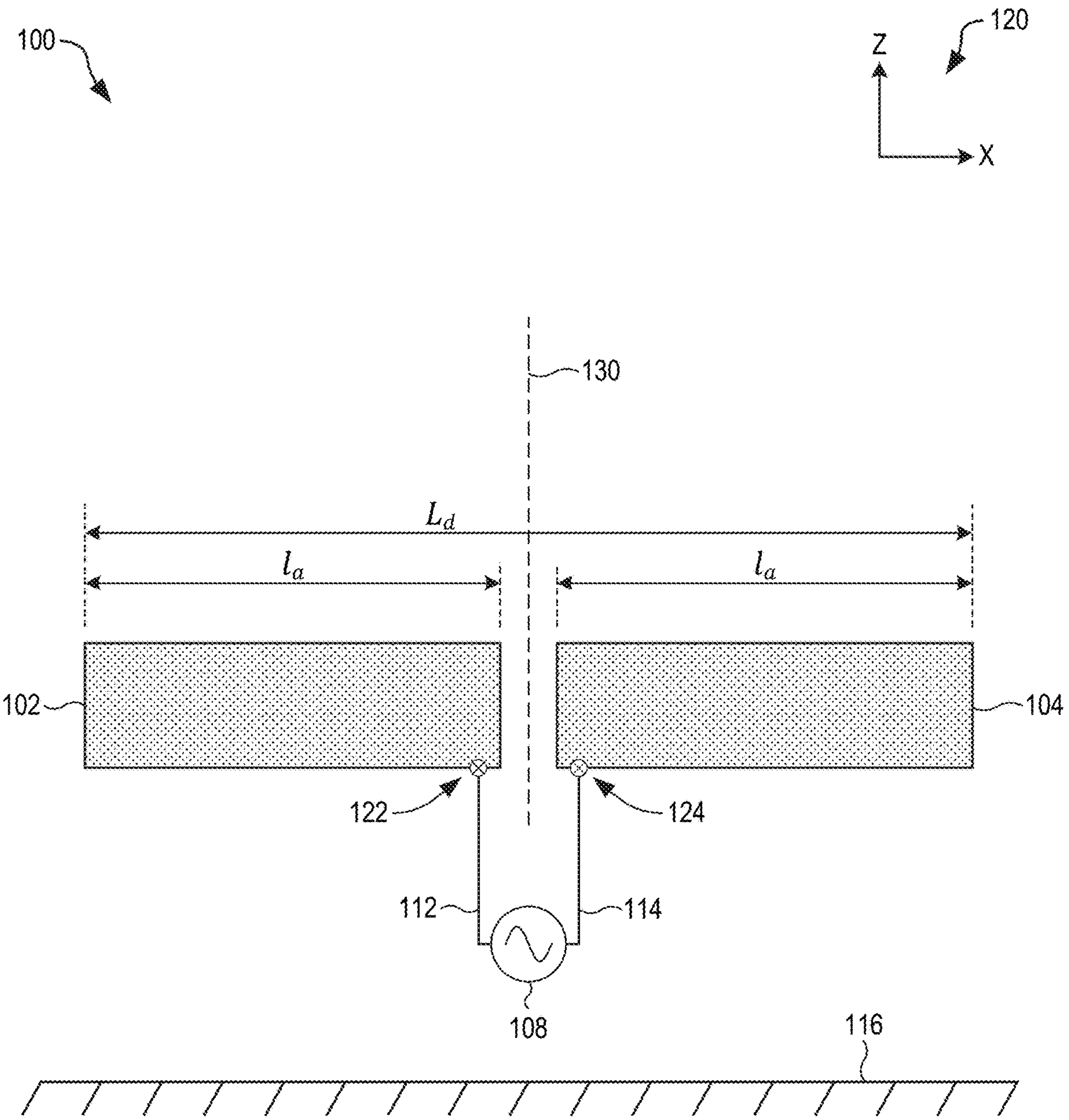
FIG. 1 (PRIOR ART)
FIG. 1 shows a co-planar dipole antenna that has a first arm and a second arm.

FIG. 1 shows a co-planar dipole antenna 100 that has a first arm 102 and a second arm 104. The dipole antenna 100 is "co-planar" in that the arms 102 and 104 lie flat in the same x-z plane (see right-handed coordinate system 120). Each of the arms 102 and 104 is an electrically conductive material (e.g., metal) shaped as a rectangle that has an arm length $l_a$ in the x direction. The arms 102 and 104 may be formed on a dielectric substrate (e.g., a circuit board) or as free-standing metal sheets or plates. The arms 102 and 104 exhibit mirror symmetry about a symmetry axis 130 that is parallel to the z axis. The total length of the dipole antenna 100 in the x direction is denoted $L_d$, which is approximately $2l_a$.

The co-planar dipole antenna 100 is center-fed with complementary drive signals such that the first arm 102 acts as a counterpoise for the second arm 104, and vice versa. In the example of FIG. 1, a signal source 108 outputs a first drive signal 112 that is fed to the first arm 102 at a first feed point 122 that is located near the symmetry axis 130. Similarly, the signal source 108 outputs a second drive signal 114 that is fed to the second arm 104 at a second feed point 124 that is also located near the symmetry axis 130. Although not shown in FIG. 1, a balun may be used to impedance match the signal source 108 to the arms 102 and 104.

The co-planar dipole antenna 100 is a resonant structure that operates over a bandwidth centered at a resonant frequency $f_r$. The resonance condition for the arms 102 and 104 is $l_a \approx n\lambda_r/4$, where n is a positive integer, $\lambda_r = c/f_r$ is the resonant wavelength, and c is the speed of light. When n=1, $l_a \approx \lambda_r/4$ (i.e., $L_d \approx \lambda_r/2$) and the dipole antenna 100 acts as a half-wave dipole antenna that operates at its fundamental resonance. When n=3, $l_a \approx 3\lambda_r/4$ (i.e., $L_d \approx 3\lambda_r/2$) and the dipole antenna 100 acts as a 3/2-wave dipole antenna that operates at its third harmonic. Typically, only odd values of n are used since even values of n result in (theoretical) infinite impedance. Furthermore, due to the bandwidth, the dipole antenna 100 need not be operated exactly on-resonance (e.g., a 5/4-wave dipole antenna or double extended Zepp antenna).

The co-planar dipole antenna 100 has a radiation profile that is omnidirectional in the y-z plane that coincides with the symmetry axis 130. For example, when n=1, the radiation profile will be shaped as a torus whose axis of revolution is parallel to the x axis. Half of the radiated power will be directed downward (i.e., in the −z direction) with the remaining half being directed upward (i.e., in the +z direction). To improve gain in the upward direction by up to +3 dB, a reflector 116 may be placed beneath the planar dipole antenna 100 to redirect the downward radiated power into additional upward radiated power.

Figure 2:
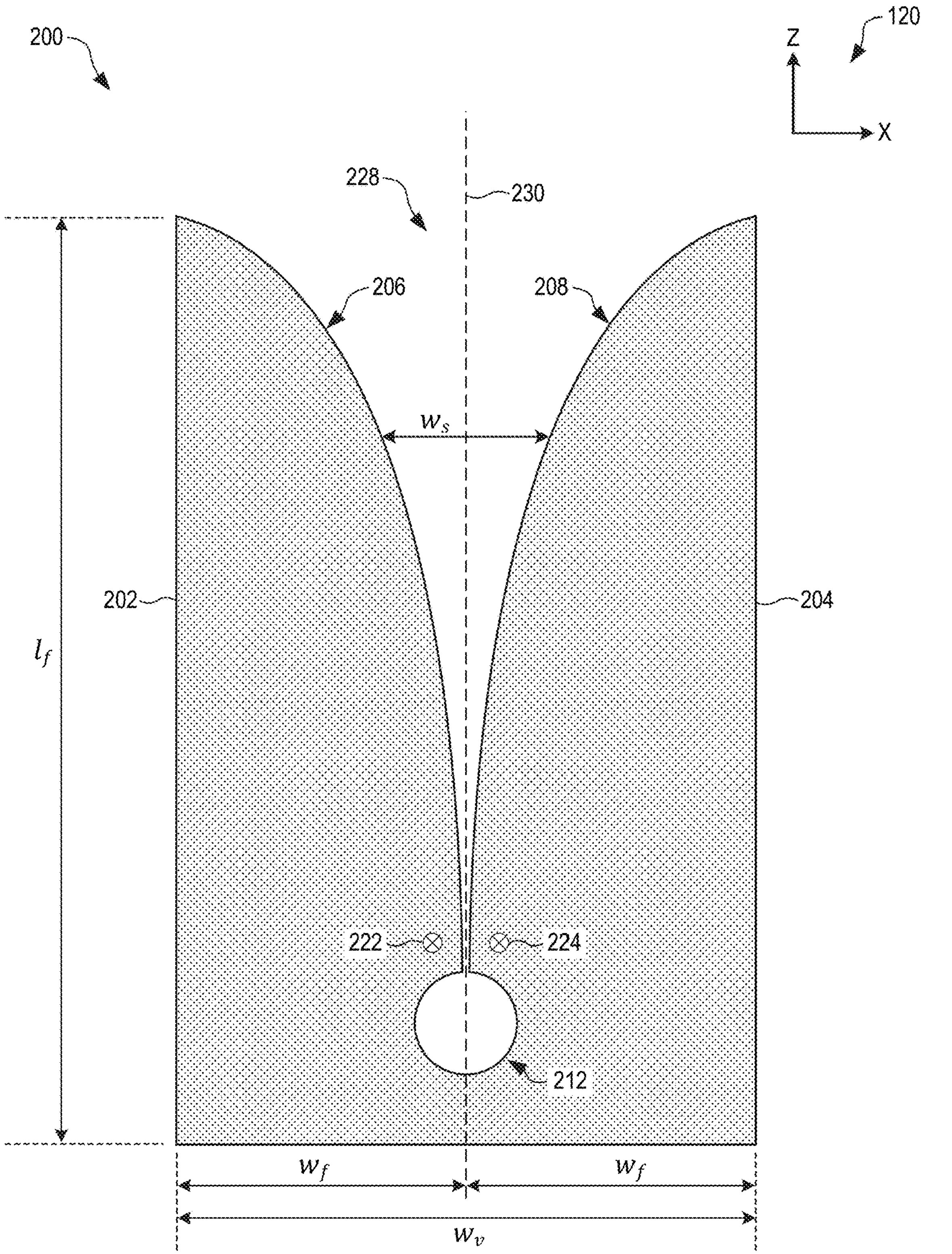
FIG. 2 (PRIOR ART)
FIG. 2 shows a co-planar Vivaldi antenna that has a first fin and a second fin.

FIG. 2 shows a co-planar Vivaldi antenna 200 that has a first fin 202 and a second fin 204. The Vivaldi antenna 200 is "co-planar" in that the fins 202 and 204 lie flat in the same x-z plane. Each of the fins 202 and 204 is an electrically conductive material (e.g., metal) that is bounded by a curved edge. Specifically, the first fin 202 has a first curved edge 206 and the second fin 204 has a second curved edge 208. The fins 202 and 204 exhibit mirror symmetry about a symmetry axis 230 that is parallel to the z axis. The curved edges 206 and 208 therefore serve as the sides of a tapered slot 228 that is devoid of electrically conducting material. The width $w_s$ of the tapered slot 228 in the x direction increases along the +z direction (i.e., the tapered slot 228 "flares" outward). The curved edges 206 and 208 are typically exponential, but may have other mathematical forms.

The co-planar Vivaldi antenna 200 is fed with a pair of balanced drive signals. Typically, these drive signals are fed to the fins 202 and 204 at respective feed points 222 and 224 that are located on opposite sides of the tapered slot 228. For example, the feed points 222 and 224 may be located near the narrow end of the tapered slot 228 (i.e., where the width $w_s$, is smallest). At this narrow end, the tapered slot 228 behaves like a slotline having a relatively low characteristic impedance (e.g., less than 100Ω). Moving in the +z direction, the impedance of the tapered slot 228 increases with the width $w_s$.

Since most antennas are driven with an unbalanced signal, a balun is typically used to drive the co-planar Vivaldi antenna 200. For example, a microstrip-to-slotline transition may be used to induce the balanced drive signals at the feed points 222 and 224. The transition includes a microstrip transmission line that perpendicularly crosses the symmetry axis 230, where it is terminated with a short or stub (e.g., a radial stub). In this case, a planar quarter-wave cavity stub 212 may be used to terminate the tapered slot 228. The cavity stub 212 cooperates with the short or stub to provide wideband impedance matching. The cavity stub 212 also provides a high impedance so that the induced drive currents flow upwards into the tapered slot 228. Another method for driving the Vivaldi antenna 200 may be used without departing from the scope hereof. Such methods include, but are not limited to, directly feeding a pair of balanced electrical signals to the feed points 222 and 224 or the curved edges 206 and 208, coaxial feeding with a center conductor that is routed perpendicularly across the tapered slot 228 and terminated in a short or stub, and using a different type of planar-waveguide-to-slotline transition.

In FIG. 2, the cavity stub 212 is co-planar with the fins 202 and 204 and shaped as an electrically non-conductive circle that is centered on the symmetry axis 230. The fins 202 and 204 are electrically shorted together beneath (i.e., in the −z direction) the cavity stub 212. This electrical short appears as an inductance in parallel with the tapered slot 228. The cavity stub 212 may have a different shape (e.g., square, rectangle, polygon, etc.). Alternatively, the cavity stub 212 may be replaced with another type of quarter-wave slotline stub. The cavity stub 212 is not necessary and may be excluded without departing from the scope hereof.

The co-planar Vivaldi antenna 200 is an end-fire traveling-wave antenna that, when driven at a frequency f, radiates upward (i.e., in the +z direction) from the region of the tapered slot 228 where $w_s \approx c/2f$. Thus, higher frequencies are emitted near the bottom of the tapered slot 228 (i.e., closer to the cavity stub 212) while lower frequencies are emitted near the top. Because it is a traveling-wave antenna, the Vivaldi antenna 200 features very high bandwidths that can extend over several octaves. The emitted radiation is linearly polarized in the x direction.

Each of the fins 202 and 204 has a maximum fin length $l_f$ in the z direction and a maximum fin width w f in the x direction. The width $w_v$ of the co-planar Vivaldi antenna 200 is measured along the x direction between the farthest edges of the fins 202 and 204, as shown in FIG. 2. Thus, the co-planar Vivaldi antenna 200 has a width $w_s = 2w_f$. One feature of the co-planar Vivaldi antenna 200 is that it has the same total width $w_v$ throughout its entire length $l_f$.

Figure 3:
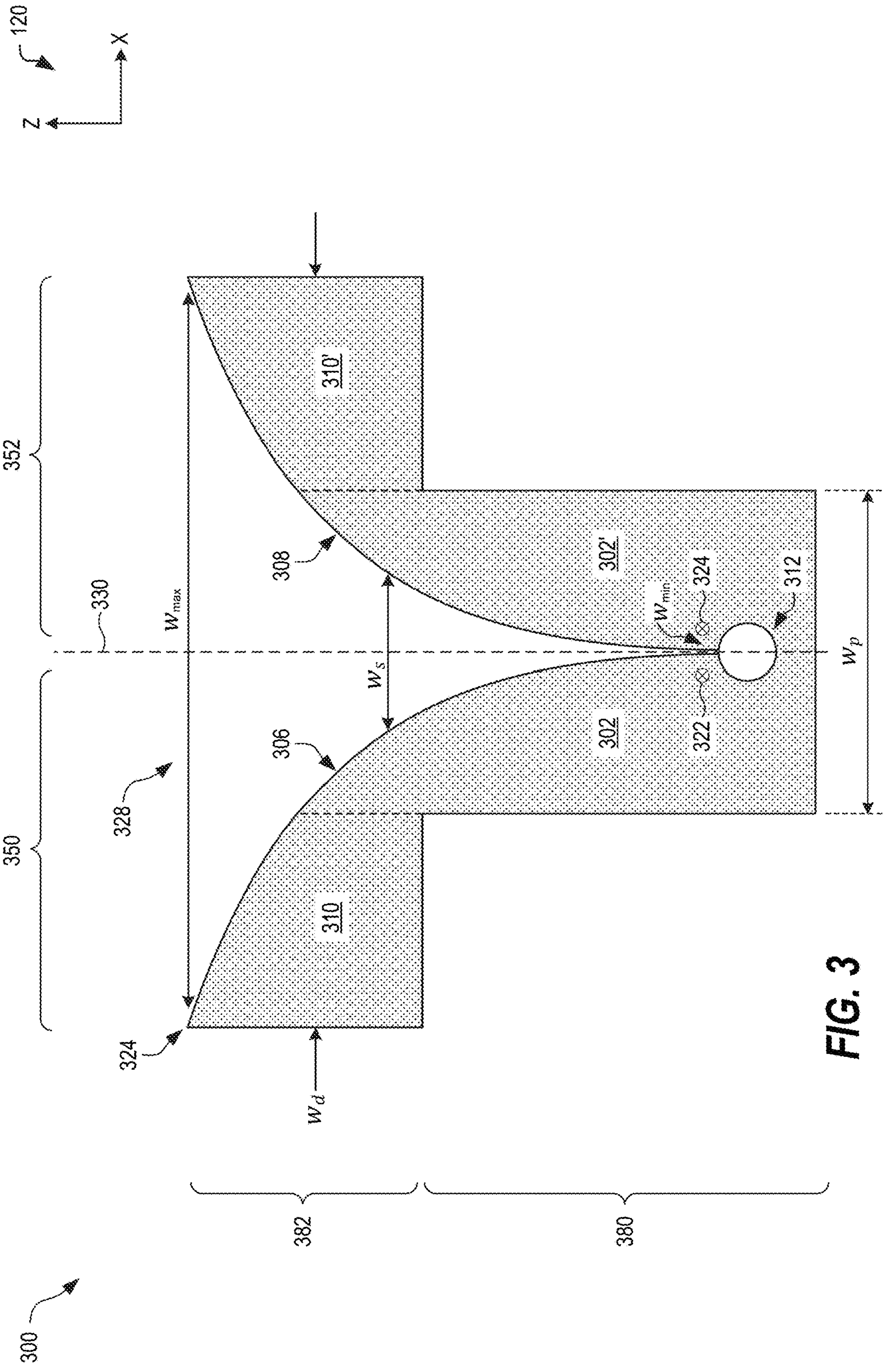
FIG. 3 shows a broadband antenna that combines features of the co-planar dipole antenna of FIG. 1 and the co-planar Vivaldi antenna of FIG. 2, in an embodiment.

FIG. 3 shows a broadband antenna 300 that combines features of the co-planar dipole antenna 100 of FIG. 1 and the co-planar Vivaldi antenna 200 of FIG. 2. The broadband antenna 300 includes a first radiator 350 and a second radiator 352 that exhibit mirror symmetry about a symmetry axis 330 that is parallel to the z axis. The radiators 350 and 352 are formed from an electrically conductive material (e.g., metal, high-conductivity silicon, etc.) and may lie flat in the same x-z plane. For example, the radiators 350 and 352 may comprise copper on the same layer of a printed circuit board. In this case, the radiators 350 and 352 are supported by a dielectric layer of the circuit board. Alternatively, the radiators 350 and 352 may be free-standing metal sheets or plates.

Each of the radiators 350 and 352 is bounded by at least one curved edge. Specifically, the first radiator 350 has a first curved edge 306 and the second radiator 352 has a second curved edge 308. The curved edges 306 and 308 are similar to the curved edges 206 and 208 of FIG. 2. Accordingly, the curved edges 306 and 308 therefore serve as the sides of a tapered slot 328 that, like the tapered slot 228 of FIG. 2, is devoid of electrically conducting material. Also similar to the tapered slot 228 of FIG. 2, the tapered slot 328 has a width $w_s$ in the x direction that increases along the +z direction from a minimum width $w_{min}$ to a maximum width $w_{max}$. The width $w_s$ may be strictly increasing along the +z direction (as shown) or non-strictly increasing (e.g., stepped). The location of the minimum width $w_{min}$ along the symmetry axis 330 is between the maximum width $w_{max}$ and the electrical short between the radiators 350 and 352.

The broadband antenna 300 may be fed similarly to the Vivaldi antenna 200 of FIG. 2 or another type of Vivaldi antenna or tapered-slot antenna known in the art. For example, complementary drive signals may be fed to the radiators 350 and 352 at a first feed point 322 and a second feed point 324 that are typically located where the width $w_s$ of the tapered slot 328 is smallest. For impedance matching, the broadband antenna 300 may include a cavity stub 312 that is similar to the cavity stub 212 of FIG. 2. Similarly, the radiators 350 and 352 may be shorted together beneath (i.e., in the −z direction) the tapered slot 328. For the example of FIG. 3, where the broadband antenna 300 includes the cavity stub 312, the radiators 350 and 352 may be shorted together beneath the stub 312, like the Vivaldi antenna 200 of FIG. 2.

The broadband antenna 300 has a proximal portion 380 that is closest to the feed points 322 and 324 along the z direction. The broadband antenna 300 also has a distal portion 382 that is farthest from the feed points 322 and 324 along the z direction. One feature of the broadband antenna 300 is that the proximal portion 380 has a proximal width w p in the x direction that is less than a distal width w d of the distal portion 382. Thus, unlike the co-planar Vivaldi antenna 200 of FIG. 2, the broadband antenna 300 does not have the same width throughout its entire length.

Figure 4:
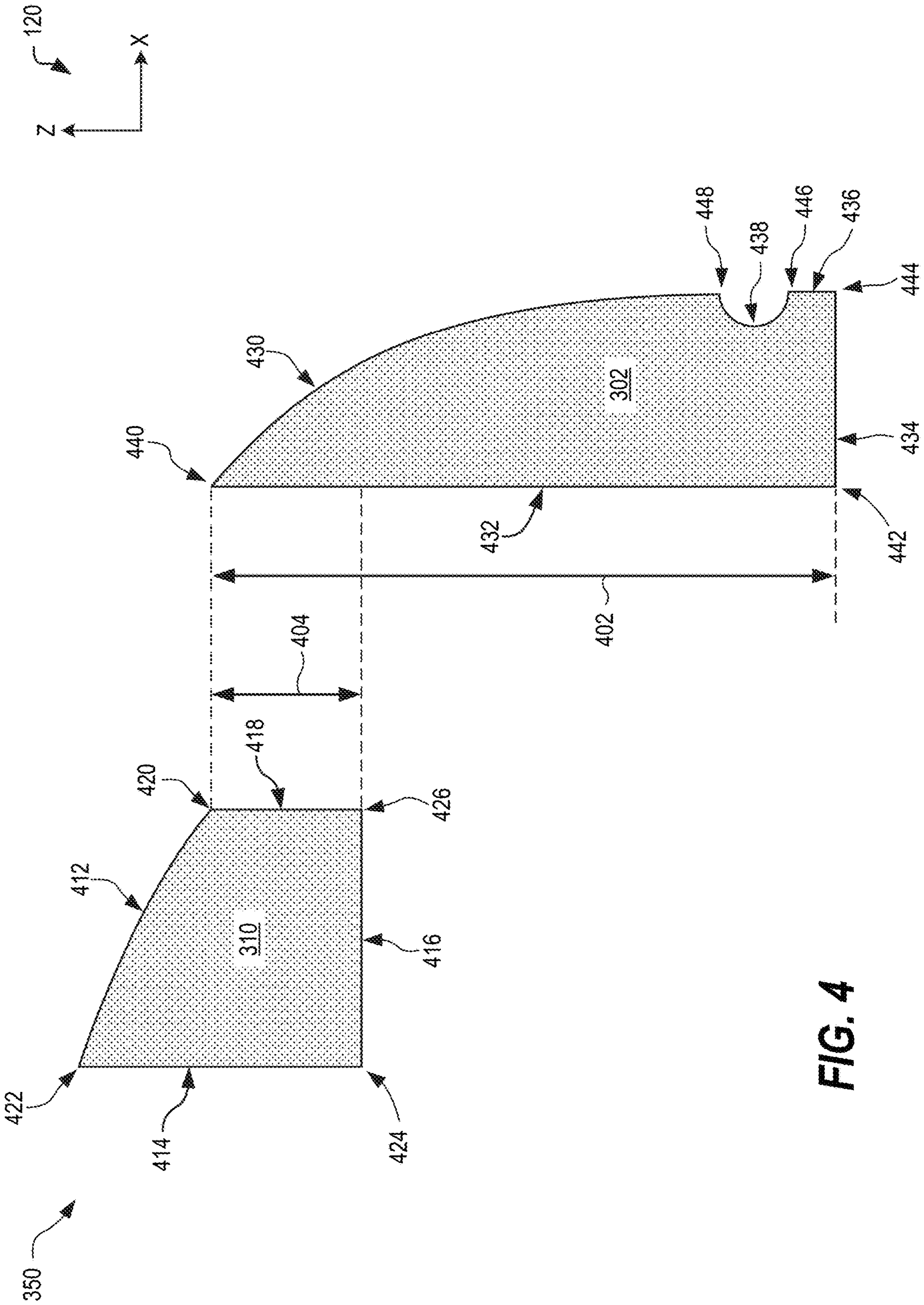
FIG. 4 is an exploded view of a radiator of the broadband antenna of FIG. 3, in an embodiment.

FIG. 4 is an exploded view of the first radiator 350 of FIG. 3. The first radiator 350 includes a half-Vivaldi sub-radiator 302 and a curved monopole sub-radiator 310 that are joined (i.e., electrically shorted to each other) to form the first curved edge 306. The half-Vivaldi sub-radiator 302 is similar to the first fin 202 of the Vivaldi antenna 200 of FIG. 2. The curved monopole sub-radiator 310 is similar to the first arm 102 of the dipole antenna 100 FIG. 1 except that it includes a curved edge. Due to the mirror symmetry of the radiators 350 and 352, the following description of the first radiator 350 also applies to the second radiator 352.

Each of the half-Vivaldi sub-radiator 302 and curved monopole sub-radiator 310 is a two-dimensional shape whose boundary can be described by a set of edges and vertices. A "vertex" is a point on the boundary that can be defined as a "kink", i.e., a point at which the mathematical curve defining the boundary is non-differentiable. An "edge" is a line that joins two vertices. An edge may be straight or curved. In the example of FIG. 4, the half-Vivaldi sub-radiator 302 is bounded by the vertices 440, 442, 444, 446, and 448 and the edges 430, 432, 434, 436, and 438. The curved monopole sub-radiator 310 is bounded by the vertices 420, 422, 424, and 426 and the edges 412, 414, 416, and 418. Herein, two edges are "adjacent" if they share a vertex.

The half-Vivaldi sub-radiator 302 includes a first curved edge 430 that extends between a first vertex 448 and a second vertex 440. The half-Vivaldi sub-radiator 302 also includes a first straight edge 432 that extends between the second vertex 440 and a third vertex 442. The first curved edge 430 and first straight edge 432 are adjacent, sharing the second vertex 440. The curved monopole sub-radiator 310 includes a second curved edge 412 that extends between a fourth vertex 422 and a fifth vertex 420. The curved monopole sub-radiator 310 also includes a second straight edge 418 that extends between the fifth vertex 420 and a sixth vertex 426. The second curved edge 412 and second straight edge 418 are adjacent, sharing the fifth vertex 420. The straight edges 418 and 432 are both parallel to the z axis (i.e., the end-fire direction of the antenna 300) and are therefore parallel to each other. The second straight edge 418 has a second length 404 (in the z direction) that is less than a first length 402 of the first straight edge 432.

As shown in FIG. 3, the straight edges 418 and 432 coincide such that the vertices 420 and 440 coincide (i.e., the vertices 420 and 440 are the same point). In this case, the curved edges 412 and 430 cooperatively form the first curved edge 306 of FIG. 3, i.e., the curved edges 412 and 430 are differentiable where they meet. While FIG. 3 shows the curved edges 306 and 308 as being exponential, the curved edges 306 and 308 may have another mathematical form (e.g., Klopfenstein, hyperbolic, a polynomial, etc.) without departing from the scope hereof.

Because the second length 404 is less than the first length 402, the entire second straight edge 418 coincides with only a portion of the first straight edge 432. As can be seen from FIGS. 3 and 4, the second straight edge 418, the portion of the first straight edge 432 with which the second straight edge 418 coincides, the second vertex 440, and the fifth vertex 420 are geometrical features of only the sub-radiators 302 and 310. That is, the first radiator 350 does not have these features. These features have been introduced for clarity of illustration and description. Accordingly, the sub-radiators 302 and 310 should be considered together as a single entity (i.e., the first radiator 350) that operates as a whole.

In FIGS. 3 and 4, the half-Vivaldi sub-radiator 302 is further bounded by an edge 434 that is adjacent to first straight edge 432, sharing the vertex 442. The edge 434 may be straight (as shown), curved, or a combination thereof. When straight, the edge 434 may be perpendicular to the first straight edge 432, although this is not necessary. Also shown in FIGS. 3 and 4, the half-Vivaldi sub-radiator 302 may be further bounded by a straight edge 436 that coincides with the symmetry axis 330, and is therefore shorted to its mirror image 302'. The half-Vivaldi sub-radiator 302 may be further bounded by a curved edge 438 that is adjacent to the straight edges 436 and 430. The curved edge 438 forms part of the cavity stub 312. In the example of FIG. 3, the curved edge 438 is shaped as part of a semicircle. When the cavity stub 312 is excluded, the straight edge 436 may be extended upward to the bottom of the tapered slot 328.

In FIGS. 3 and 4, the curved monopole sub-radiator 310 is further bounded by an edge 414 that extends between the vertex 422 and the vertex 424. The edge 414 may be straight (as shown), curved, or a combination thereof. When straight, the edge 414 may be parallel to the z axis, as shown, although this is not necessary. The curved monopole sub-radiator 310 is further bounded by an edge 416 that extends between the vertex 424 and the vertex 426. The edge 416 may be straight (as shown), curved, or a combination thereof. When straight, the edge 416 may be parallel to the x axis such that it intersects the first straight edge 432 at a right angle, as shown.

Figure 5A:
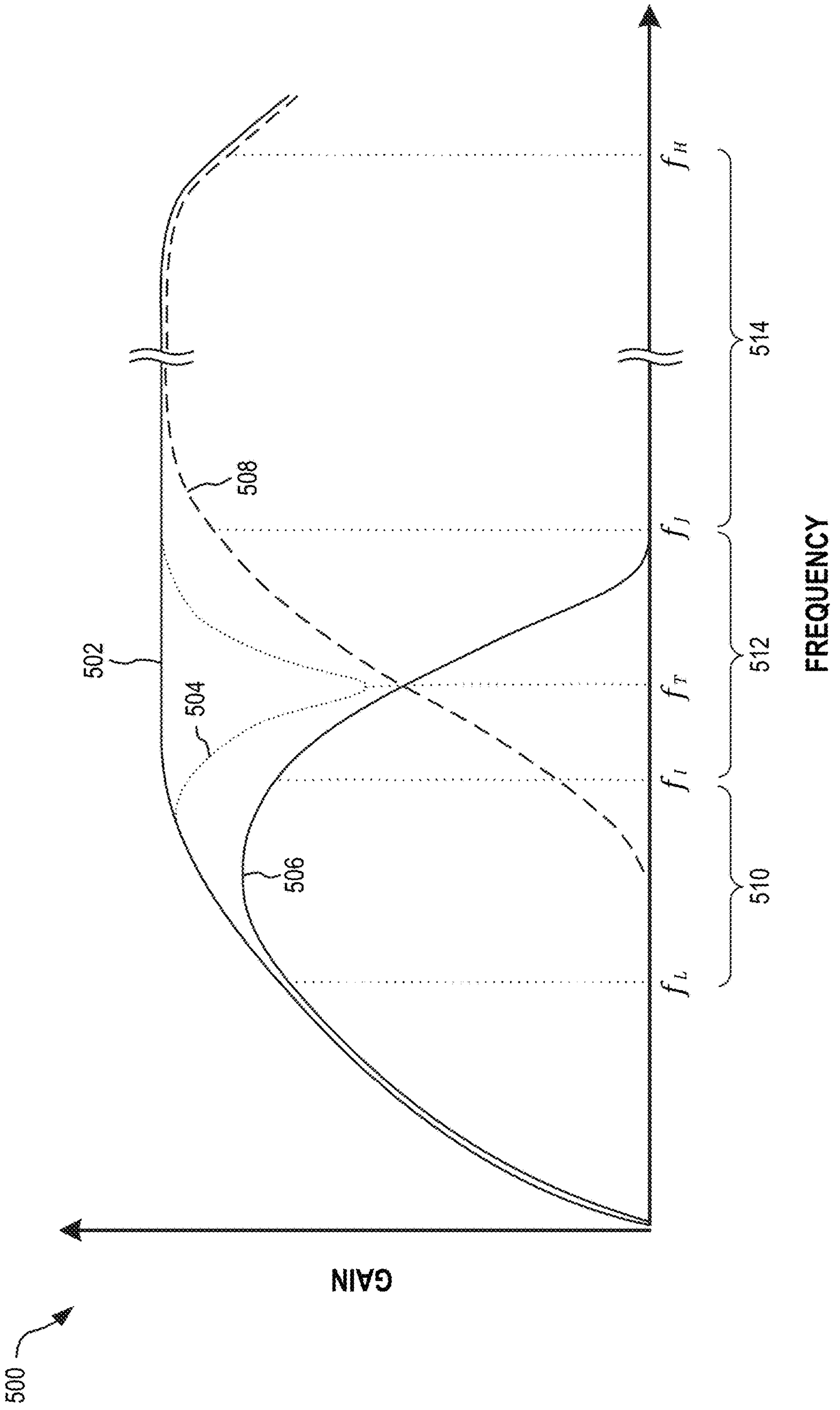
FIG. 5A is a graph showing gain of the broadband antenna of FIG. 3 as a function of frequency.

FIG. 5A is a graph 500 showing gain of the broadband antenna 300 of FIG. 3 as a function of frequency. The broadband antenna 300 operates over a bandwidth that is represented by the curve 502, which extends from a lower cutoff frequency $f_L$ to an upper cutoff frequency $f_H$. The curve 502 is the sum of curves 506 and 508. The curve 506 represents the gain of the curved monopole sub-radiator 310 and its mirror image 310', which cooperate to act like a co-planar dipole antenna (e.g., the co-planar dipole antenna 100 of FIG. 1). At lower frequencies, emission from the broadband antenna 300 originates primarily from this co-planar dipole, as opposed to the half-Vivaldi sub-radiator 302 (and its mirror image 302'). Operation in this manner is referred to herein as "dipole mode" since the broadband antenna 300 approximately behaves like a dipole antenna at these lower frequencies. In the dipole mode, the gain of the broadband antenna 300 extends from the lower cutoff frequency $f_L$ to an intermediate cutoff frequency $f_I$. This range of frequencies is indicated in FIG. 5A as a lower frequency range 510.

The curve 508 represents the gain of the half-Vivaldi sub-radiator 302 and its mirror image 302', which cooperate to act as a co-planar Vivaldi antenna (e.g., the co-planar Vivaldi antenna 200 of FIG. 2). At higher frequencies, emission from the broadband antenna 300 originates primarily in this Vivaldi antenna, as opposed to the dipole antenna. Operation in this manner is referred to herein as "Vivaldi mode" since the broadband antenna 300 primarily behaves like a Vivaldi antenna at these higher frequencies. In the Vivaldi mode, the gain of the broadband antenna 300 extends from an intermediate cutoff frequency $f_J$ to the upper cutoff frequency $f_H$. This range of is indicated in FIG. 5A as an upper frequency range 514.

Over an intermediate frequency range 512 that spans from $f_I$ to $f_J$, the broadband antenna 300 operates partially in Vivaldi mode and partially in dipole mode. Within the intermediate frequency range 512 is a transition frequency $f_T$ at which the gain of the broadband antenna 300 in Vivaldi mode equals the gain of the broadband antenna in dipole mode, i.e., where the curves 506 and 508 cross. In FIG. 5A, $f_I<f_J$, giving rise to a dip 504 in the curve 502. However, the size of the dip 504 (i.e., its width in frequency and height in gain) can be reduced by designing the broadband antenna 300 such that $f_I$ and $f_J$ are similar. In fact, when $f_I$ and $f_J$ are both −3 dB cutoff frequencies and $f_t=f_I=f_J$, then the broadband antenna 300 will transition between dipole and Vivaldi modes without the dip 504 (as shown by the curve 502).

FIG. 5A shows how the monopole sub-radiator 310 (and its mirror image 310') extends the low-frequency operation of the half-Vivaldi sub-radiator 302 (and its mirror image 302'). In general, the bandwidth of a conventional Vivaldi antenna, such as the Vivaldi antenna 200 of FIG. 2, can only be extended to lower frequencies by increasing its size (i.e., the width $w_v$ and length $l_v$ of FIG. 2) to have a larger maximum gap $w_{max}$. However, this approach results in an antenna that is spatially much bigger than the broadband antenna 300 of FIG. 3.

Figure 5B:
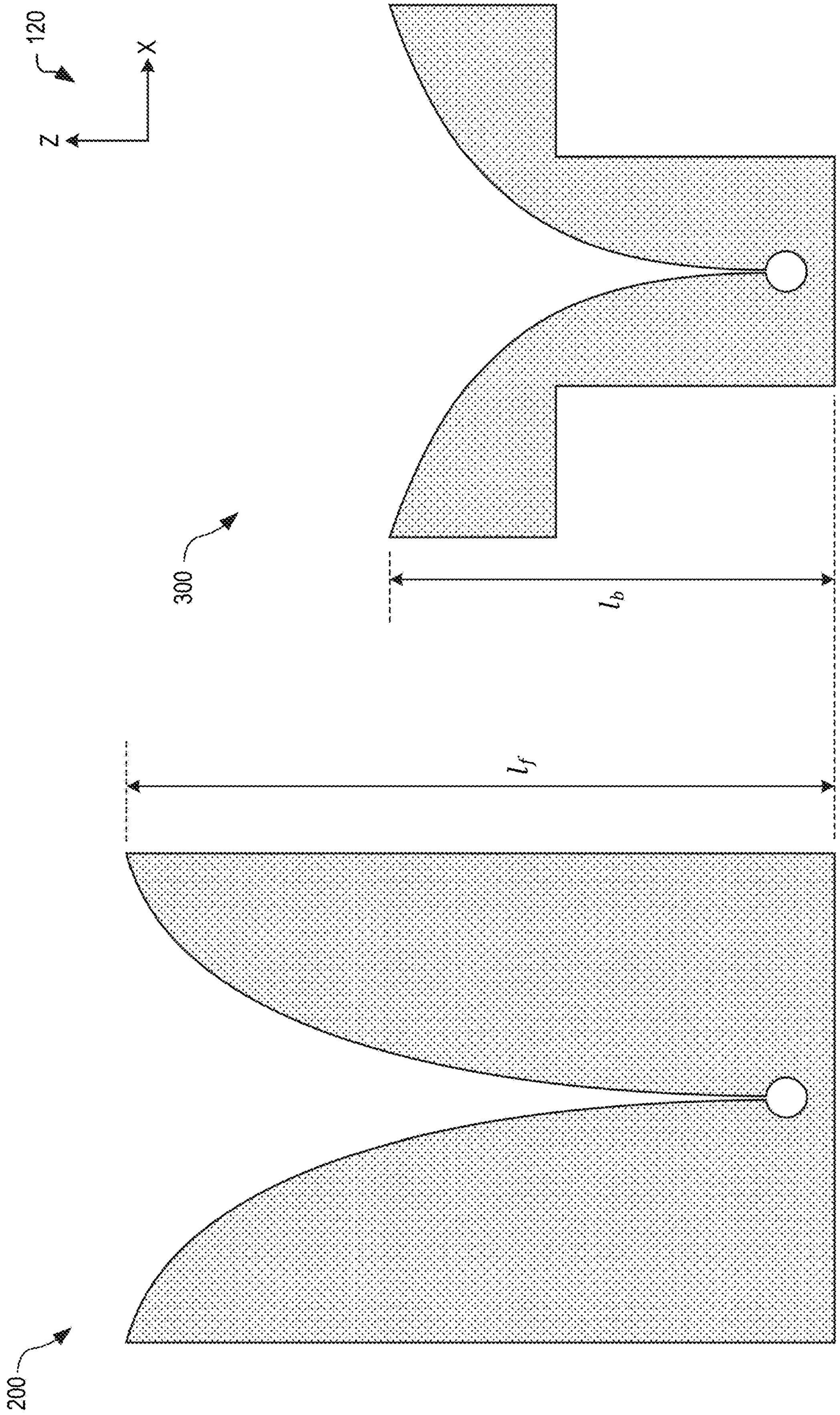
FIG. 5B shows how the broadband antenna of FIG. 3 is smaller than the co-planar Vivaldi antenna of FIG. 2 for the same frequency range.

FIG. 5B illustrates how the broadband antenna 300 is advantageously smaller than the co-planar Vivaldi antenna 200 over the same frequency range. The overall length, along z, of the Vivaldi antenna 200 is equal to the fin length $l_f$. The overall length $l_b$, along z, of the broadband antenna 300 is almost half of $l_f$. It is assumed in FIG. 5B that the antennas 200 and 300 operate over the same frequency range and therefore have cavity stubs of the same size and location from the bottom edge. Furthermore, the broadband antenna 300 is only slightly wider, along x, than the Vivaldi antenna 200 (see the width $w_v$ in FIG. 2). Accordingly, the broadband antenna 300 has an area, or footprint, that is approximately half that of the Vivaldi antenna 200.

Figure 6:
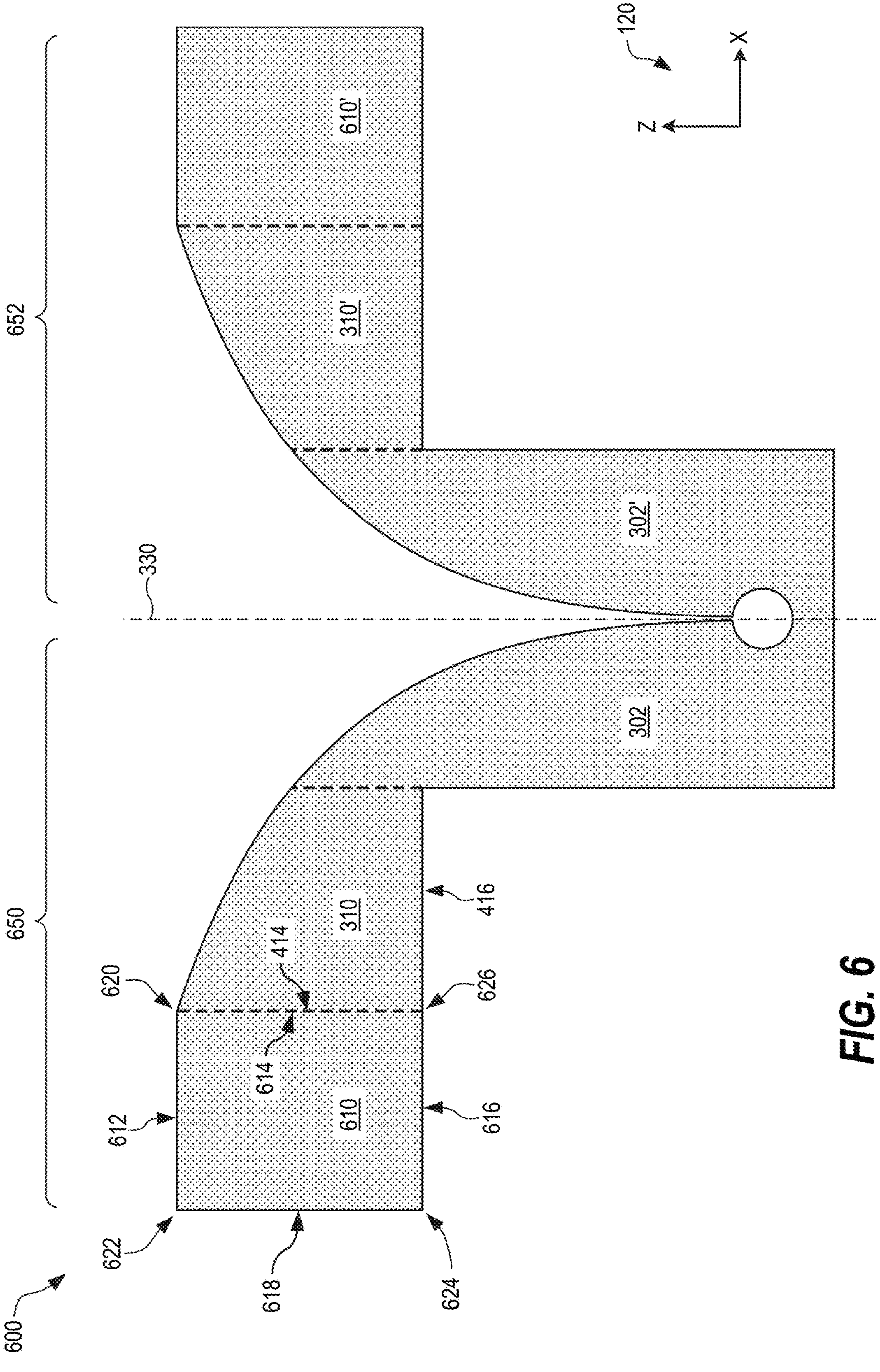
FIG. 6 shows a broadband antenna that is similar to the broadband antenna of FIG. 3 except that it includes a pair of rectilinear monopole sub-radiators, in an embodiment.

FIG. 6 shows a broadband antenna 600 that is similar to the broadband antenna 300 of FIG. 3 except that it includes a pair of rectilinear monopole sub-radiators. Specifically, the broadband antenna 600 includes a first radiator 650 and a second radiator 652 that are co-planar with each other and exhibit mirror symmetry about the symmetry axis 330. The first radiator 650 is similar to the first radiator 350 of FIG. 3 in that it includes the curved monopole sub-radiator 310 and the half-Vivaldi sub-radiator 302. However, first radiator 650 further includes a first rectilinear monopole sub-radiator 610 bounded by edges 612, 614, 616, and 618 and vertices 620, 622, 624, and 626. The edge 614 fully coincides with the edge 414 of the curved monopole sub-radiator 310 (i.e., the vertex 620 coincides with the vertex 422 of FIG. 4 and the vertex 626 coincides with the vertex 426 of FIG. 4). Thus, the first rectilinear monopole sub-radiator 510 has a width, in the z direction, equal to that of the edge 414. The edge 616 is adjacent and perpendicular to the edge 614, and is therefore colinear with the edge 416. When the sub-radiators 310 and 610 are formed from one continuous piece of metal, the edges 414 and 614 and vertex 626 are not physical.

The sub-radiator 610 is "rectilinear" in that the edges 612, 614, 616, and 618 are straight. Furthermore, in FIG. 6 the sub-radiator 610 is shown with internal right angles between adjacent edges such that the sub-radiator 610 is shaped as a rectangle. Alternatively, one or more of the internal angles may be acute or obtuse. In the general case, the rectilinear sub-radiator 610 may be shaped as any closed polygon, either regular or irregular, having any number of sides. Alternatively, one or more of the edges 612, 616, and 618 may be curved or a combination of curved and straight.

The sub-radiators 610 and 310 cooperate to form a first arm that is similar to the first arm 102 of FIG. 1. Similarly, the mirror image 610' of the sub-radiator 610 and the mirror image 310' of the sub-radiator 310 cooperate to form a second arm that is similar to the second arm 104 of FIG. 1. These first and second arms cooperate to act like a co-planar dipole antenna (e.g., the co-planar dipole antenna of FIG. 1). The sub-radiator 610 and its mirror image 610' may be thought of as extending the lengths of the first and second arms in the x direction, thereby reducing the fundamental resonant frequency of the co-planar dipole antenna. Thus, the sub-radiator 610 and its mirror image 610' may be introduced to further tailor the antenna gain when operating in dipole mode (i.e., the curve 506 of FIG. 5A).

Although not shown in FIGS. 3 and 4, the broadband antenna 300 may further include a planar reflector that is perpendicular to the symmetry axis 330 and located behind (i.e., along the −z direction) the radiators 350 and 352. This reflector is similar to the reflector 116 of FIG. 1 in that it redirects downward radiated power into additional upward radiated power. The reflector is primarily used for dipole mode, as the antenna 300 radiates very little downward power when operating in Vivaldi mode. The broadband antenna 600 of FIG. 6 may be similarly configured with a planar reflector.

Figure 7:
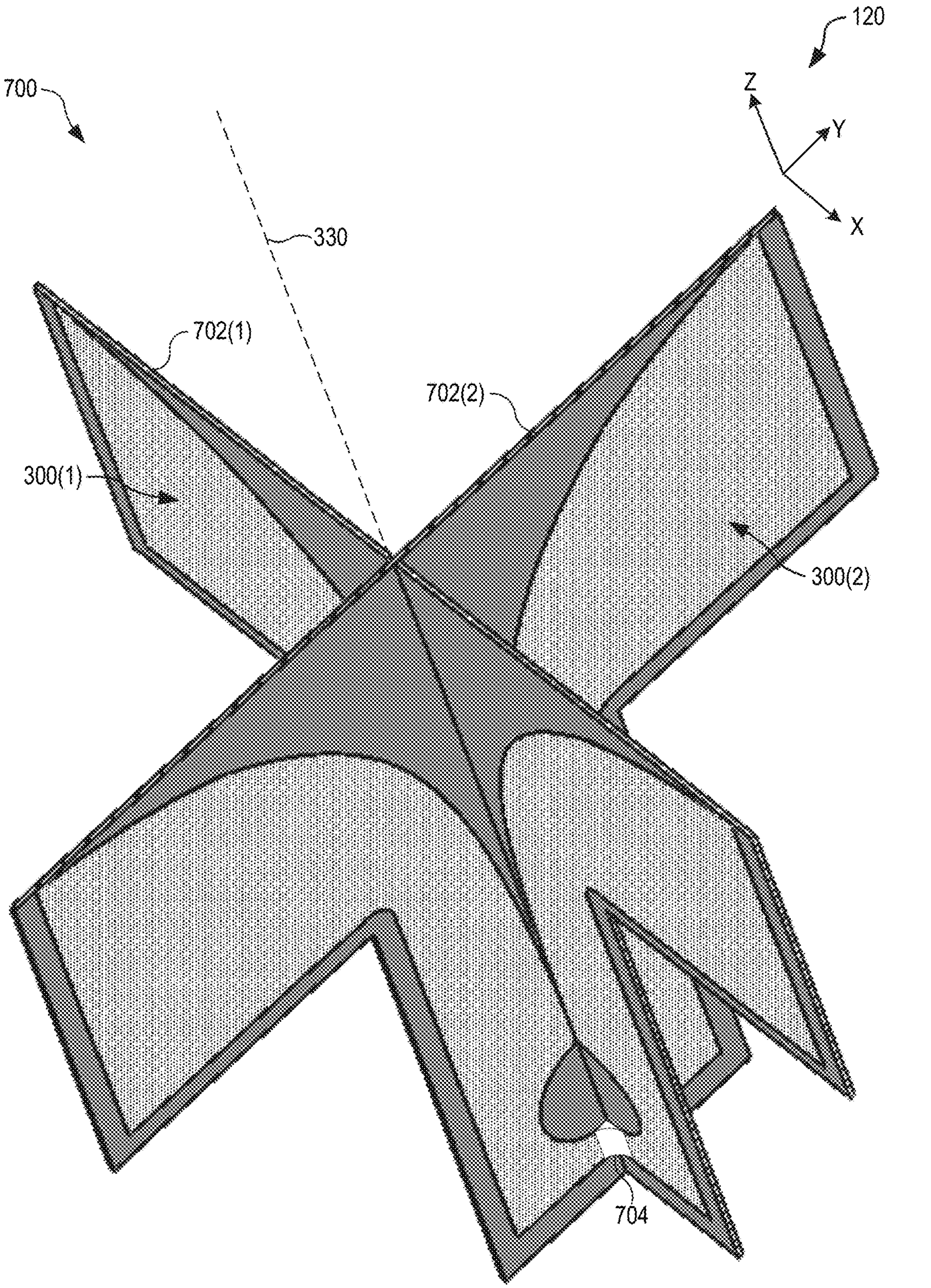
FIG. 7 is a perspective view of a dual-polarization antenna system that includes two of the broadband antenna of FIG. 3, in an embodiment.

FIG. 7 is a perspective view of a dual-polarization antenna system 700 that includes two of the broadband antenna 300 of FIG. 3. Specifically, the antenna system 700 includes a first broadband antenna 300(1) formed on a first circuit board 702(1) that lies in the x-z plane and a second broadband antenna 300(2) formed on a second circuit board 702(2) that lies in the y-z plane. The circuit boards 702(1) and 702(2) intersect each other perpendicularly such that the antennas 300(1) and 300(2) share the same symmetry axis 330. The antennas 300(1) and 300(2) are both oriented with their tapered slots 328 opening upward in the +z direction.

The antennas 300(1) and 300(2) are fed separately (e.g., see the feed points 322(1) and 322(2) in FIG. 3). When the antennas 300(1) and 300(2) are driven with two electrical signals that are in-phase with each other, the emitted radiation will be linearly polarized at an angle (in the x-y plane)

that depends on the ratio of the amplitudes of the two electrical signals. If the two electrical signals are 90° out-of-phase with each other, the emitted radiation will be circularly polarized. The antennas 300(1) and 300(2) are electrically isolated except possibly for the edges 436. Thus, when the edges 436 of the antennas 300(1) and 300(2) are shorted to each other, the antennas 300(1) and 300(2) share a common ground. For example, FIG. 7 shows the antennas 300(1) and 300(2) shorted to each other with a solder bridge 704.

Figure 8:
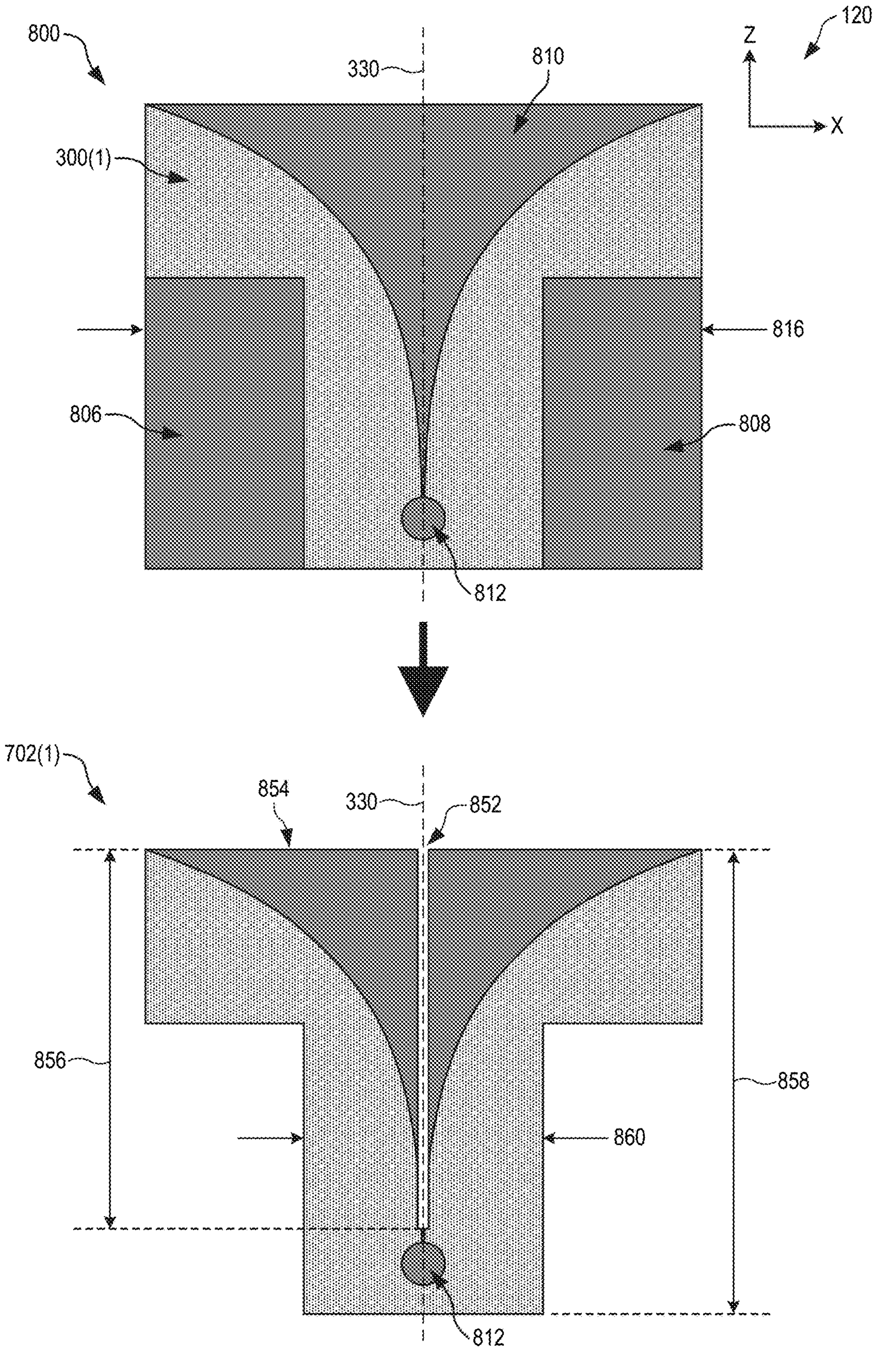
FIG. 8 illustrates fabrication of a first circuit board of the dual-polarization antenna system of FIG. 7, in an embodiment.

FIG. 8 illustrates fabrication of the first circuit board 702(1) of FIG. 7. The first broadband antenna 300(1) is formed on one side, or an internal layer, of a rectangular circuit board 800. At this stage of fabrication, shown in the top of FIG. 8, there are four regions of the circuit board 800 without metallization: a tapered slot region 810 corresponding to the tapered slot 328 of FIG. 3, a bottom left region 806, a bottom right region 808, and a cavity-stub region 812 corresponding to the cavity stub 312 of FIG. 3.

In some embodiments, the regions 806 and 808 are removed, as shown in the bottom of FIG. 8. The resulting first circuit board 702(1) is shaped like a "tee" with an upper portion that has an upper width 816 and a lower portion that has a lower width 860 that is less than the upper width 816. A slit 852 may be formed in the circuit board 800, extending downward (i.e., in the −z direction) along the symmetry axis 330 from a top edge 854 of the circuit board 800. The slit 852 extends downward a slit distance 856 that is less than a height 858 of the circuit board 800. The slit 852 has a width, along x, that is at least as large as the thickness of the second circuit board 702(2). In one embodiment, the width of the slit 852 is less than the minimum width $w_{min}$ to ensure that the slit 852 does not distort, cut, or otherwise change the shape of the curved edges 306 and 308 near the bottom of the tapered slot 328 (see FIG. 3).

Figure 9:
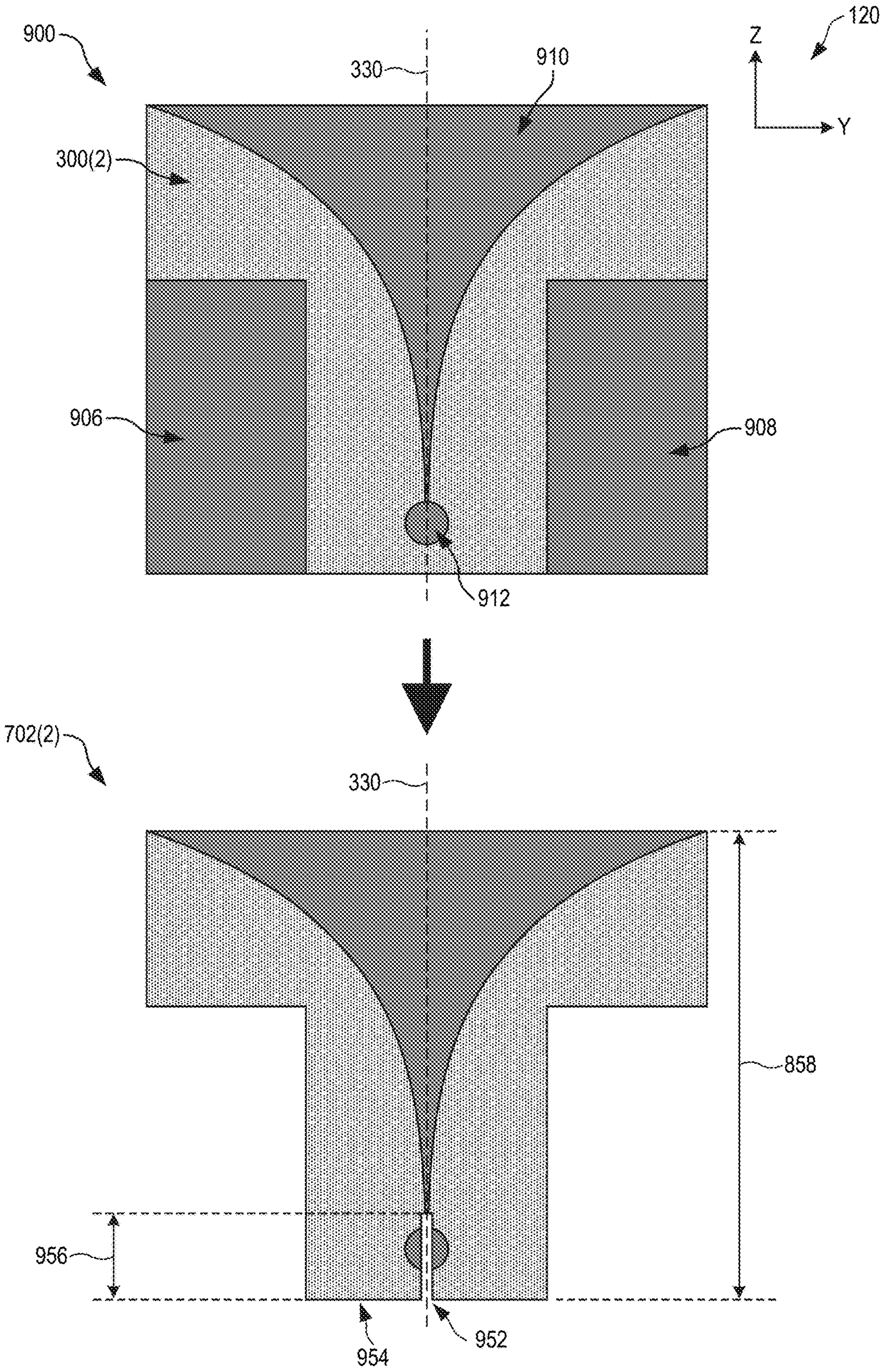
FIG. 9 illustrates fabrication of a second circuit board of the dual-polarization antenna system of FIG. 7, in an embodiment.

FIG. 9 illustrates fabrication of the second circuit board 702(2) of FIG. 7. The second broadband antenna 300(2) is formed on one side, or an internal layer, of a rectangular circuit board 900. As shown in FIG. 9, the circuit board 900 may have the same height and width as the circuit board 800 of FIG. 8. At this stage of fabrication, shown in the top of FIG. 9, there are four regions of the circuit board 900 without metallization: a tapered slot region 910 corresponding to the tapered slot 328 of FIG. 3, a bottom left region 906, a bottom right region 908, and a cavity-stub region 912 corresponding to the cavity stub 312 of FIG. 3.

In some embodiments, the regions 906 and 908 are removed, as shown in the bottom of FIG. 9. Like, the first circuit board 702(1), the resulting second circuit board 702(2) is shaped like a "tee" with an upper portion that is wider than a lower portion. A slit 952 may be formed in the circuit board 900, extending upward (i.e., in the +z direction) along the symmetry axis 330 from a bottom edge 954 of the circuit board 900. The slit 952 extends a slit distance 956 that is less than the height 858. The slit 952 has a width, along y, that is at least as large as the thickness of the first circuit board 702(1). In one embodiment where the slit 952 extends past the cavity-stub region 912 and into the tapered slot region 910, the width of the slit 952 is less than the minimum width $w_{min}$ to ensure that the slit 952 does not distort, cut, or otherwise change the shape of the curved edges 306 and 308.

After fabrication of the circuit boards 702(1) and 702(2), the dual-polarization antenna system 700 of FIG. 7 may be assembled by inserting the second circuit board 702(2) downward into the slit 852 of the first circuit board 702(1). To ensure that the circuit boards 702(1) and 702(2) are aligned along z, the slit distances 856 and 858 should sum to at least the height 858. While FIGS. 7-9 show the antenna system 700 with the regions 806, 808, 906, and 908 removed, the antenna system 700 may alternatively have these regions intact. In this case, these regions may be used for routing traces, component placement, physical mounting, or other purposes.

Advantageously, the dual-polarization antenna systems 700 can be fabricated from common circuit-board materials using standard routing and etching processes, has a minimal part count that requires only standard (i.e., non-complex) and minimal assembly techniques (e.g., solder joints, alignment notches, epoxy, etc.), and requires no bulk material loading. These advantages make the dual-polarization antenna system 700 compatible with a cover or radome.

Figure 10:
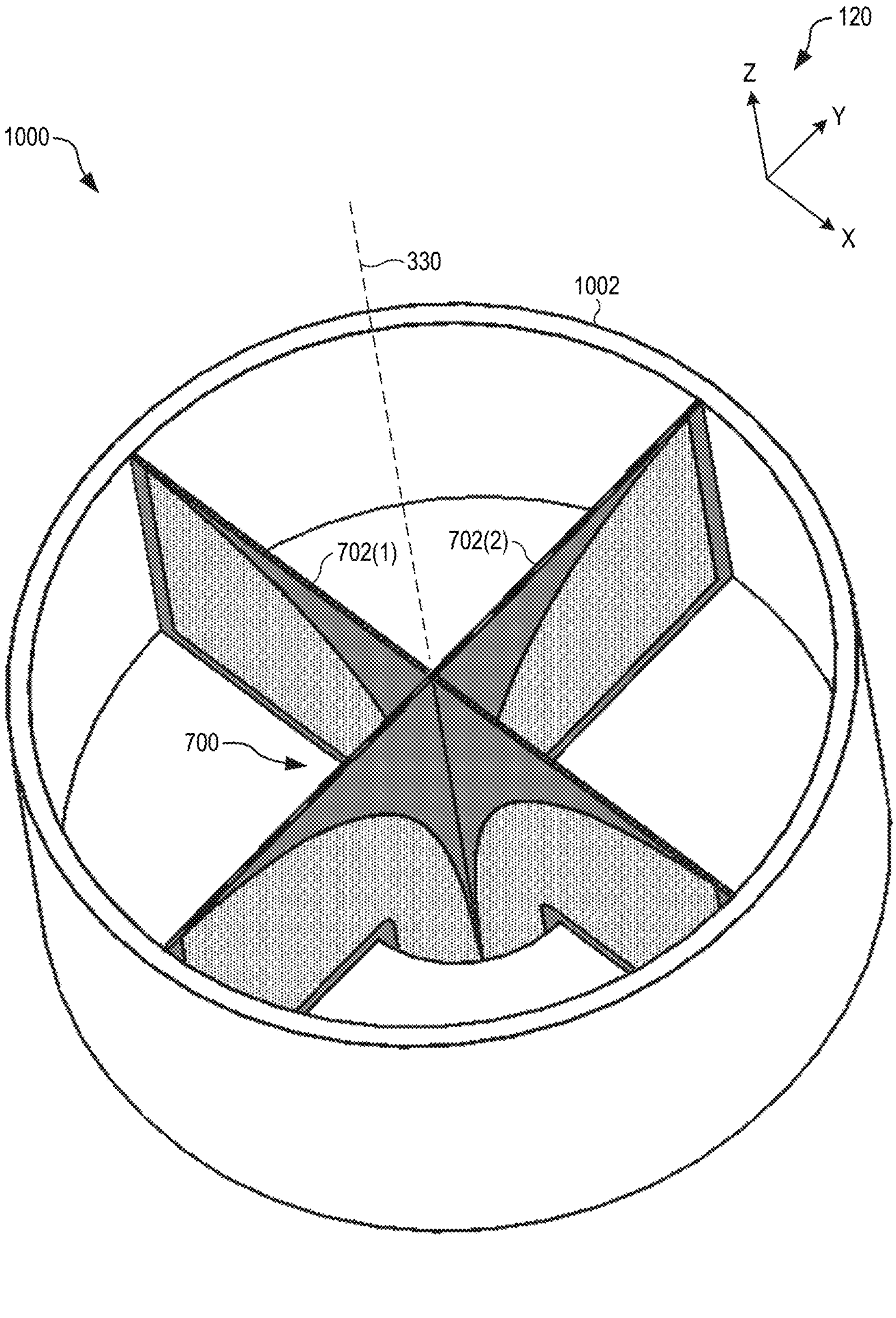
FIG. 10 is a perspective view of a dual-polarization antenna system that combines the dual-polarization antenna system of FIG. 7 with a cavity, in an embodiment.
Figure 11:
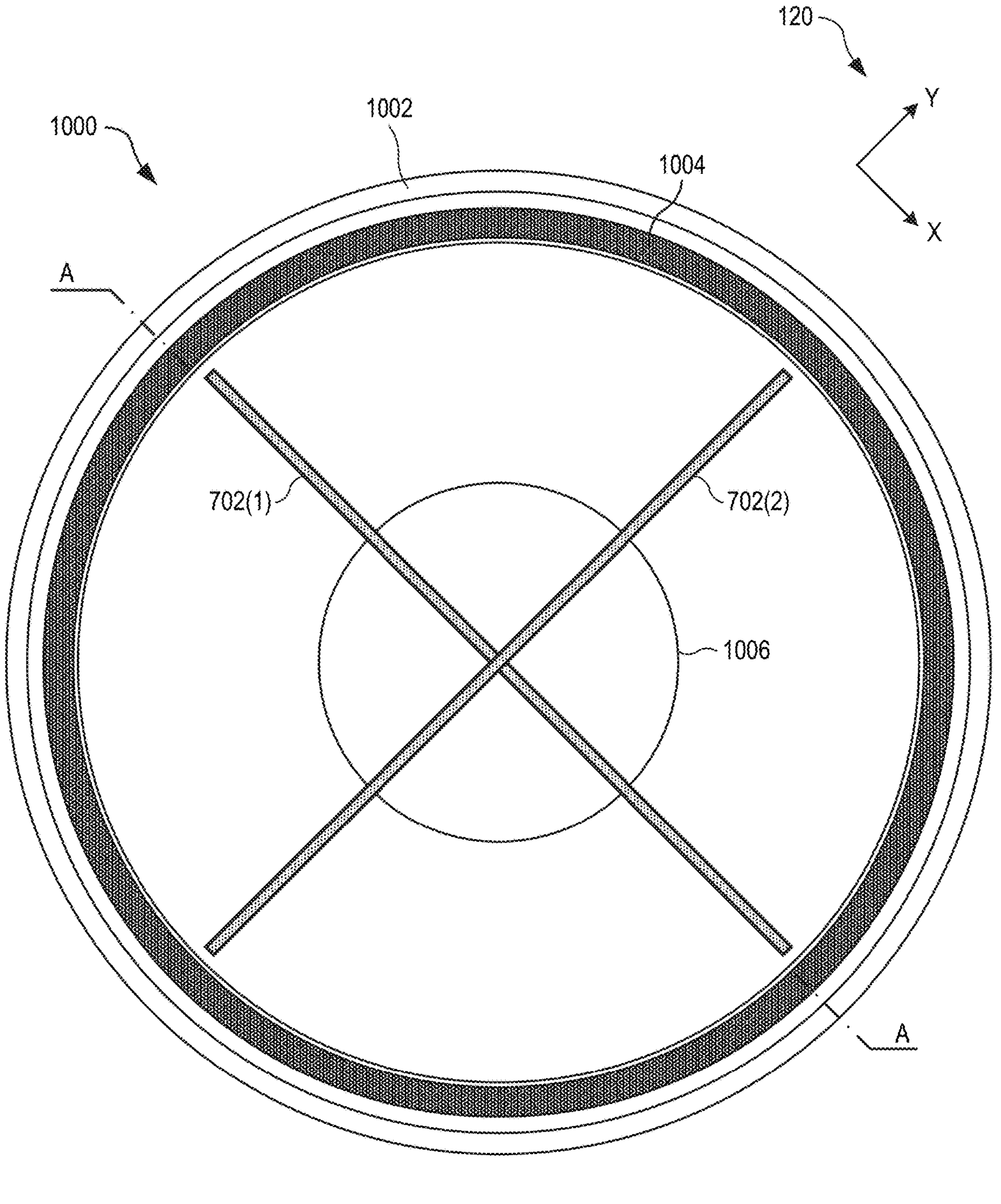
FIG. 11 is a top view of the dual-polarization antenna system of FIG. 10, in an embodiment.
Figure 12:
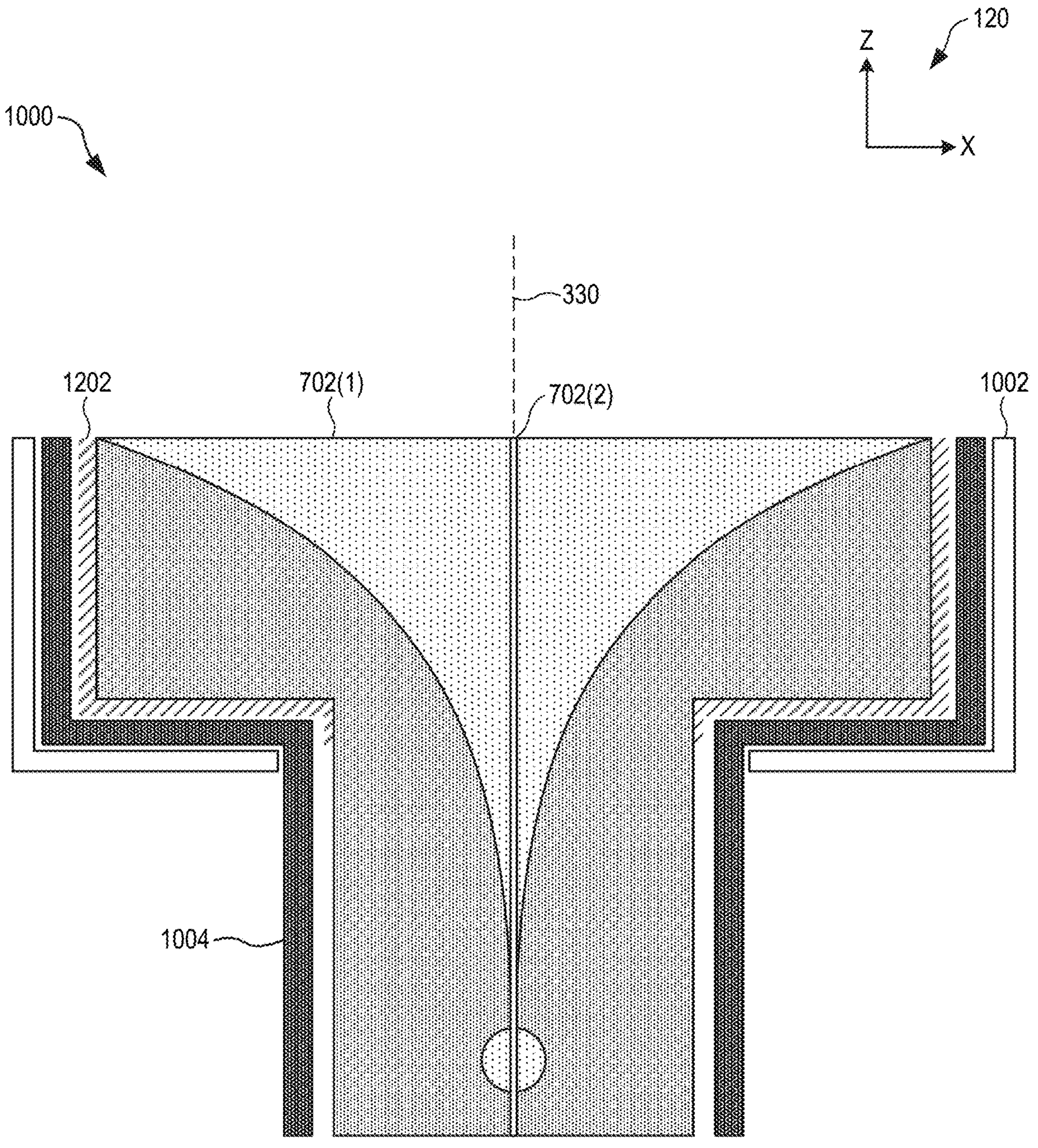
FIG. 12 is a side cut-away view of the dual-polarization antenna system of FIG. 10, in an embodiment.

FIG. 10 is a perspective view of a dual-polarization antenna system 1000 that combines the dual-polarization antenna system 700 of FIG. 7 with a cavity 1002. FIG. 11 is a top view of the antenna system 1000. FIG. 12 is a side cut-away view of the antenna system 1000 taken along the cross-section A-A indicated in FIG. 11. FIGS. 10-12 are best viewed together with the following description.

The cavity 1002 may be formed from electrically conductive material (e.g., metal) that is electrically isolated from the antenna system 700. In the example of FIGS. 10-12, the cavity 1002 is shaped as an open-ended cylindrical shell that is coaxial with the symmetry axis 330 and encircles the upper portion of the circuit boards 702(1) and 702(2). Thus, the cavity 1002 has an inner diameter that is at least as large as the upper width 816 of the circuit boards 702(1) and 702(2). The top of the cylindrical shell is open to allow radiation emitted upward (i.e., in the +z direction) to pass. The bottom of the cylindrical shell is shaped as an annulus with a center hole 1006 through which the bottom portion of the circuit boards 702(1) and 702(2) can pass. Thus, the center hole 1006 has a diameter that is at least as large as the lower width 860 of the circuit boards 702(1) and 702(2).

In one embodiment, an electrically-insulating barrier 1202 located between the cavity 1002 and the antenna system 700 ensures that the edges of the antennas 300(1) and 300(2) do not make electrical contact with the cavity 1002. For clarity, the barrier 1202 is only shown in FIG. 12. The barrier 1202 may be made of plastic, ceramic, glass-reinforced epoxy laminate, or another electrically insulating material. The circuit boards 702(1) and 702(2) may be physically secured to the barrier 1202 using epoxy or adhesive. The barrier 1202 may be similarly secured to the cavity 1002. In embodiments without the barrier 1202, the circuit boards 702(1) and 702(2) may be directly secured to the cavity 1002 using an epoxy or adhesive that is electrically insulating. In this case, the epoxy or adhesive acts as an insulator that prevents the antennas 300(1) and 300(2) from making electrical contact with the cavity 1002.

In some embodiments, the dual-polarization antenna system 1000 further includes an absorptive material 1004 that advantageously minimizes degrading effects of the cavity 1002, lowers frequency operation, and improves impedance matching. The absorptive material 1004 is located inside the cavity 1002 and at least partially encircles the circuit boards 702(1) and 702(2), as shown in FIGS. 11 and 12. In FIG. 12, the absorptive material 1004 extends the full length (along z) of the antenna system 1000, thereby encircling both the upper and lower portions of the circuit boards 702(1) and 702(2). However, the absorptive material 1004 may have a different length or shape without departing from the scope hereof.

Figure 13:
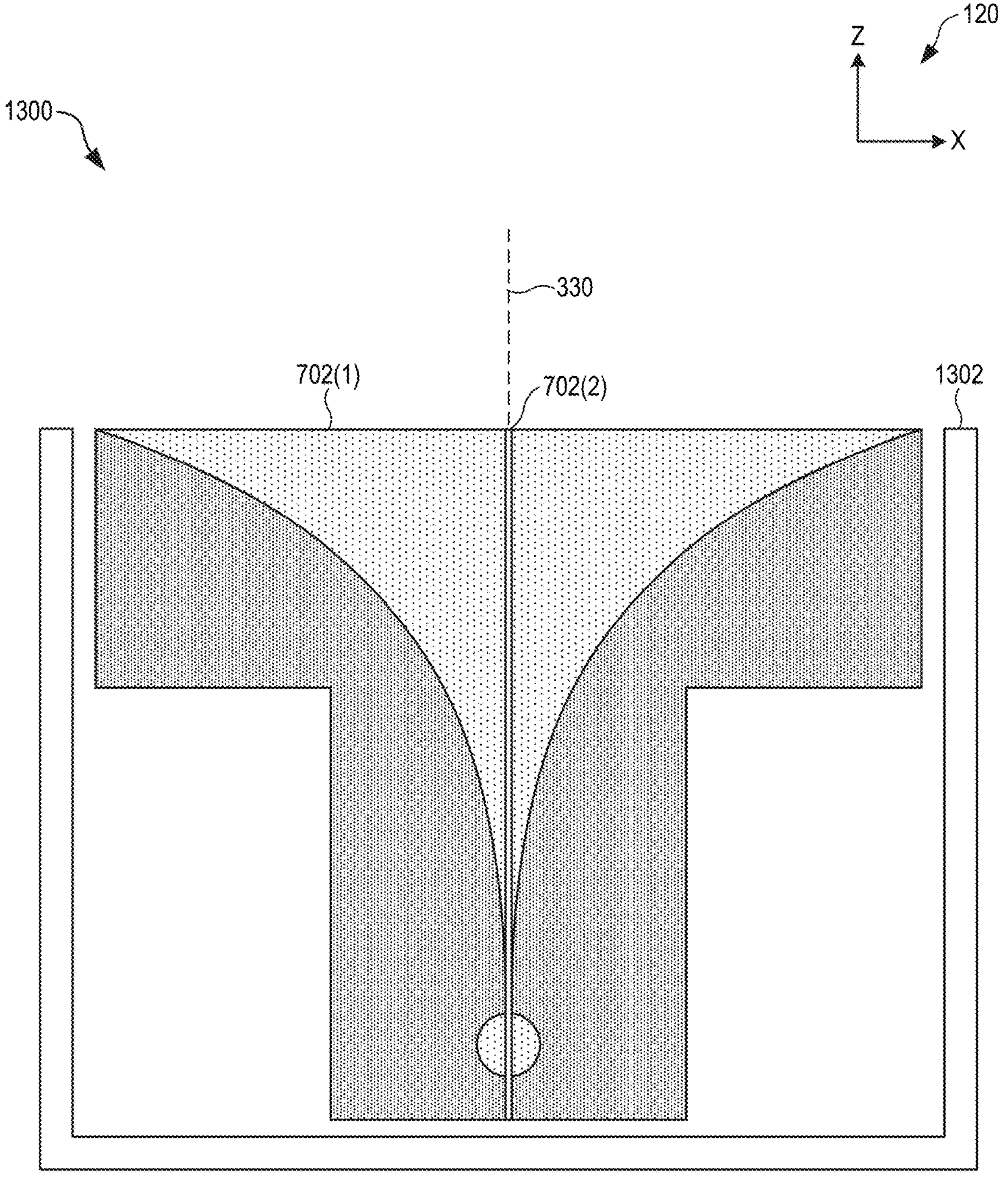
FIG. 13 is a side cut-away view of a dual-polarization antenna system 1300 that is similar to the antenna system of FIGS. 10-12, in an embodiment.

FIG. 13 is a side cut-away view of a dual-polarization antenna system 1300 that is similar to the antenna system 1000 of FIGS. 10-12 except that it has a cavity 1302 that extends along z such that it fully encircles both the upper and lower portions of the circuit boards 702(1) and 702(2). Specifically, the cavity 1302 is shaped as a cylindrical shell that is coaxial with the symmetry axis 330. The cylindrical shell is open at the top and closed at the bottom. Advantageously, the absorptive material 1004 is not needed with the antenna system 1300. Although not shown in FIG. 13, the antenna system 1300 may further include an electrically insulating barrier that is similar to the barrier 1202 of FIG. 12.

Figure 14:
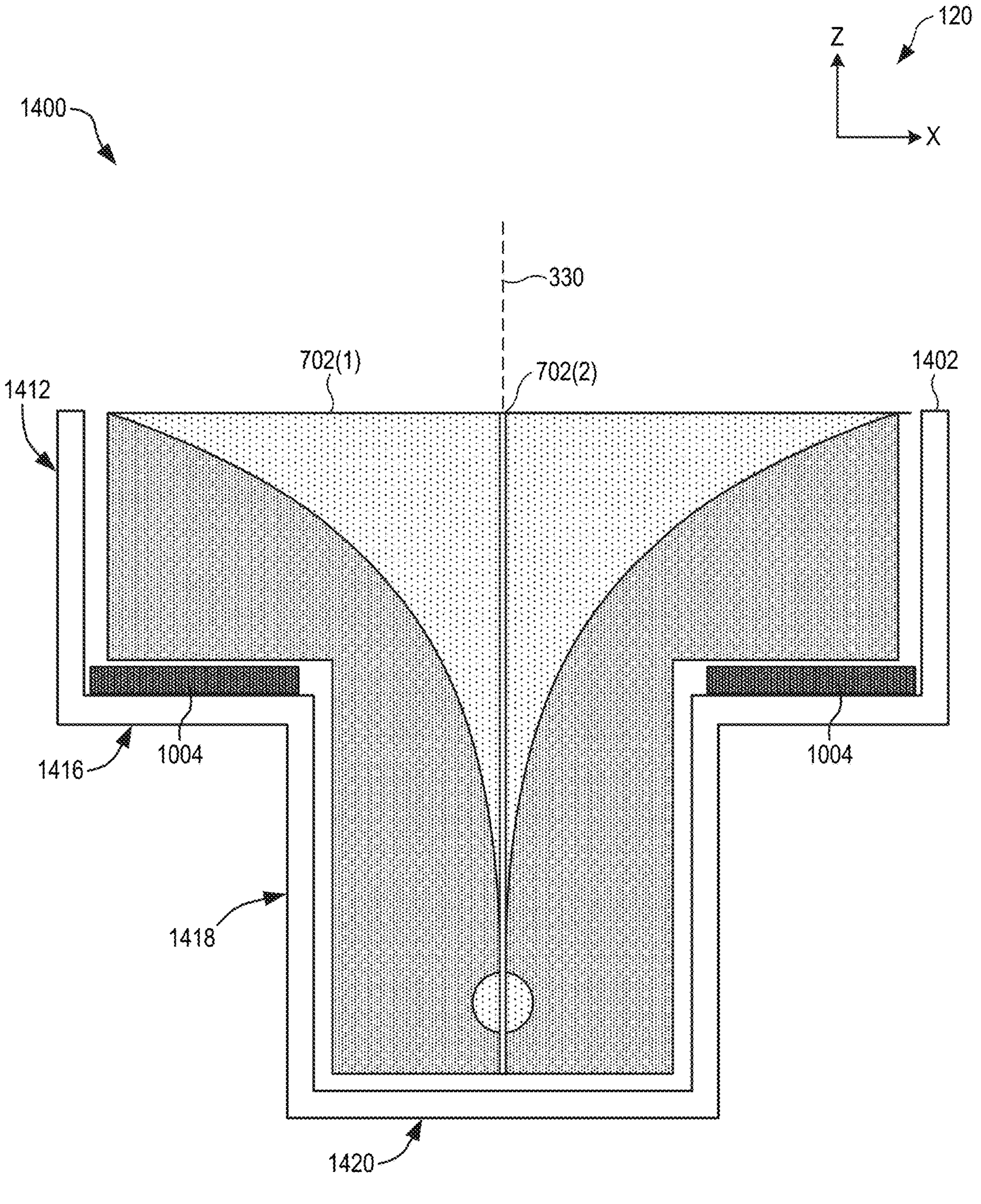
FIG. 14 is a side cut-away view of a dual-polarization antenna system that is similar to the antenna system of FIG. 13, in an embodiment.

FIG. 14 is a side cut-away view of a dual-polarization antenna system 1400 that is similar to the antenna system 1300 of FIG. 13 except that it has a cavity 1402 whose radius changes along z. Specifically, the cavity 1402 forms an upper cylindrical shell 1412 that encircles the upper portions of the circuit boards 702(1) and 702(2) and is coaxial with the symmetry axis 330. The cavity 1402 also forms a lower cylindrical shell 1418 that encircles the lower portions of the circuit boards 702(1) and 702(2) and is coaxial with the symmetry axis 330. The cylindrical shells 1412 and 1418 are joined by a shoulder 1416 that is shaped as an annulus. At the bottom of the antenna system 1400, the cavity 1402 includes an end cap 1420. The lower cylindrical shell 1418 has a radius that is less than that of the upper cylindrical shell 1412. Accordingly, the cavity 1402 more tightly conforms to the circuit boards 702(1) and 702(2) than the cavity 1302 of FIG. 13.

Due to the step change in radius, the antenna system 1400 may benefit from absorption material inside the cavity 1402. For example, the antenna system 1400 is shown in FIG. 14 with absorptive material 1004 that is shaped as an annulus and located on the shoulder 1416. However, the absorptive material 1004 may have a different size, shape, and location within the cavity 1402 without departing from the scope hereof. Although not shown in FIG. 14, the antenna system 1400 may further include an electrically insulating barrier that is similar to the barrier 1202 of FIG. 12.

Figure 15:
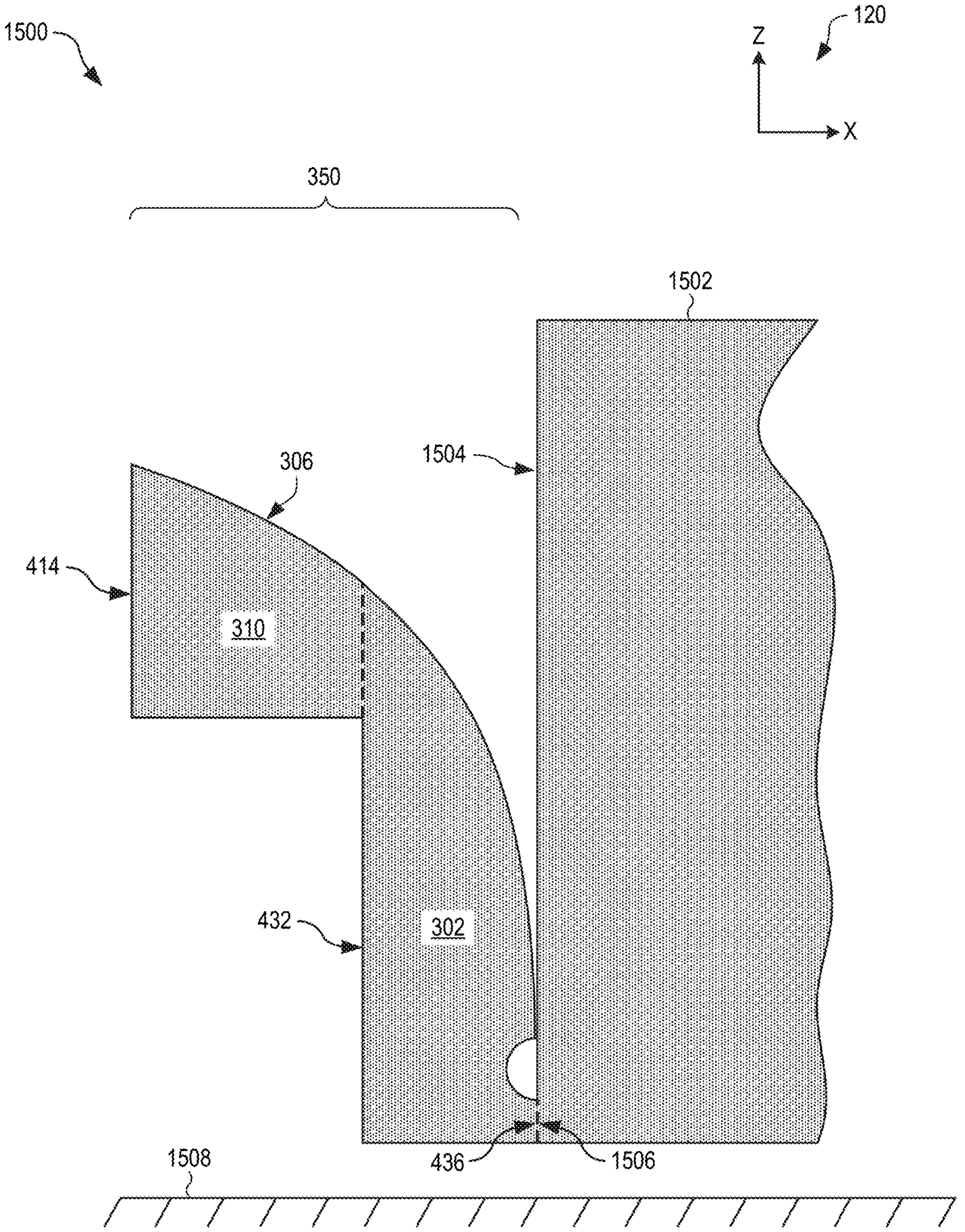
FIG. 15 shows a broadband antenna that combines the radiator of FIG. 3 with a counterpoise that is co-planar with the radiator, in an embodiment.

FIG. 15 shows a broadband antenna 1500 that combines the radiator 350 of FIG. 3 with a counterpoise 1502 that is co-planar with the radiator 350. The radiator 350 and counterpoise 1502 may be fabricated from the same electrically conductive material. For example, the radiator 350 and counterpoise 1502 may comprise copper on the same layer of a printed circuit board. In this case, the radiators 350 and counterpoise 1502 are supported by a dielectric layer of the circuit board. Alternatively, the radiator 350 and counterpoise 1502 may be free-standing metal sheets or plates.

At relatively low frequencies (e.g., less than the cutoff frequency $f_l$ of FIG. 5A), the monopole sub-radiator 310 cooperates with the counterpoise 1502 to act like a monopole antenna. Operation in this manner is referred to herein as "monopole mode". At higher frequencies (e.g., greater than the cutoff frequency $f_l$ of FIG. 5A), the half-Vivaldi sub-radiator 302 cooperates with the counterpoise 1502 to act like a half-Vivaldi antenna or half-tapered-slot antenna. Operation in this manner is referred to herein as "half-Vivaldi mode". Thus, the antenna 1500 behaves similarly to the antenna 300 of FIG. 3 in that it has two modes of operation that depend on frequency. However, the lack of mirror symmetry in the antenna 1500 affects its radiation pattern and shifts the location of its phase center.

The counterpoise 1502 is bounded by an eighth straight edge 1504 that is parallel with one or both of the edges 414 and 432 of the radiator 350. A segment 1506 of the eighth straight edge 1504 may be electrically shorted to the edge 436 of the radiator 350. The counterpoise 1502 forms an electrically non-conductive tapered slot with the first curved edge 306 of the radiator 352. This tapered slot has a width given by the perpendicular distance (i.e., the distance along x) between the edges 306 and 1504. This width increases along the eighth straight edge 1504 such that the tapered slot "flares" primarily in the +z direction.

In certain embodiments, the antenna 1500 further includes a planar reflector 1508 that is perpendicular to eighth straight edge 1504 and located behind (i.e., along the −z direction) the radiator 352 and counterpoise 1502. Like the reflector 116 of FIG. 1, the reflector 1508 redirects downward radiated power into additional upward radiated power. The reflector 1508 is primarily used for monopole mode, as the antenna 1500 radiates very little downward power when operating in half-Vivaldi mode.

In some embodiments, a dual-polarization antenna system combines two instances of the broadband antenna 1500. This embodiment is similar to the dual-polarization antenna system 700 of FIG. 7 except that the two instances of the broadband antenna 1500 replace the broadband antennas 300(1) and 300(2). Each of the two instances of the broadband antenna 1500 is planar. The two instances may intersect each other perpendicularly such that the straight edges 1502 are parallel. In one embodiment, the straight edges 1502 coincide. In another embodiment, the straight edges 1502 are parallel but are not directly shorted to each other.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An antenna radiator, comprising:
- a half-Vivaldi sub-radiator that is bounded by:
  - a first curved edge; and
  - a first straight edge adjacent to the first curved edge, the first straight edge having a first length; and
- a curved monopole sub-radiator that is co-planar with the half-Vivaldi sub-radiator and bounded by:
  - a second curved edge;
  - a second straight edge adjacent to the second curved edge, the second straight edge having a second length that is less than the first length;
  - a third straight edge adjacent to the second curved edge; and
  - a fourth straight edge adjacent to the second straight edge and the third straight edge;
  - wherein the curved monopole sub-radiator does not electrically connect to any electrically conductive material along the entirety of the fourth straight edge;
- wherein the first and second straight edges coincide such that the first and second curved edges are continuous.

2. The antenna radiator of claim 1, wherein:
- the first curved edge extends between a first vertex and a second vertex;
- the first straight edge extends between the second vertex and a third vertex;
- the second curved edge extends between the second vertex and a fourth vertex; and the second straight edge extends between the second vertex and a fifth vertex.

3. The antenna radiator of claim 1, wherein the half-Vivaldi sub-radiator is further bounded by a fifth straight edge adjacent to the first straight edge.

4. The antenna radiator of claim 3, wherein:

the fifth straight edge is perpendicular to the first straight edge;

the third straight edge is parallel to the first straight edge; and the fourth straight edge is perpendicular to the first straight edge.

5. The antenna radiator of claim 1, the half-Vivaldi sub-radiator being further bounded by a third curved edge adjacent to the first curved edge and shaped to create at least part of a cavity stub.

6. The antenna radiator of claim 5, the third curved edge being shaped as part of a semicircle.

7. The antenna radiator of claim 5, the half-Vivaldi sub-radiator being further bounded by:

a fifth straight edge adjacent to the first straight edge; and a sixth straight edge adjacent to the fifth straight edge and the third curved edge.

8. The antenna radiator of claim 7, wherein:

the fifth straight edge is perpendicular to the first straight edge; and the sixth straight edge is perpendicular to the fifth straight edge.

9. The antenna radiator of claim 1, wherein:

the antenna radiator further comprises a substrate; and the half-Vivaldi sub-radiator and the curved monopole sub-radiator comprise electrically conductive material on the substrate.

10. The antenna radiator of claim 1, the first and second curved edges cooperatively forming a differentiable curve.

11. The antenna radiator of claim 10, the differentiable curve being one of a Klopfenstein curve, an exponential curve, a hyperbolic curve, and a polynomial curve.

12. An antenna, comprising:

the antenna radiator of claim 1; and a counterpoise that is co-planar with the antenna radiator.

13. The antenna of claim 12, the counterpoise being electrically shorted to the antenna radiator.

14. The antenna of claim 12, the counterpoise having a straight counterpoise edge that is (i) parallel to the first straight edge of the antenna radiator and (ii) forms an electrically non-conductive gap with the first curved edge of the antenna radiator.

15. The antenna of claim 14, a size of the electrically non-conductive gap, transverse to the straight counterpoise edge, increasing along the straight counterpoise edge.

16. The antenna of claim 14, further comprising a planar reflector that is perpendicular to the straight counterpoise edge.

17. The antenna of claim 12, wherein:

the half-Vivaldi sub-radiator is further bounded by:

a fifth straight edge adjacent to the first straight edge; and a sixth straight edge adjacent to the fifth straight edge; and the sixth straight edge is electrically shorted to the counterpoise.

18. The antenna of claim 12, the half-Vivaldi sub-radiator and the counterpoise forming a cavity stub.

19. An antenna, comprising:

a first radiator comprising a first instance of the antenna radiator of claim 1; and a second radiator that is co-planar with the first radiator, the second radiator comprising a second instance of the antenna radiator of claim 1;

wherein:

the first and second radiators exhibit mirror symmetry about a symmetry axis;

the first curved edge of the first radiator and the first curved edge of the second radiator form a tapered slot therebetween; and a width of the tapered slot increases along the symmetry axis.

20. The antenna of claim 19, the half-Vivaldi sub-radiator of the first radiator and the half-Vivaldi sub-radiator of the second radiator cooperatively forming a Vivaldi antenna.

21. The antenna of claim 19, wherein:

the first radiator further includes a first rectilinear monopole sub-radiator that is co-planar with the first and second radiators and joined to the first radiator;

the second radiator further includes a second rectilinear monopole sub-radiator that is co-planar with the first and second radiators and joined to the second radiator; and the first and second rectilinear monopole sub-radiators cooperatively form a dipole antenna.

22. The antenna of claim 19, wherein:

the tapered slot extends along the symmetry axis between a minimum gap and a maximum gap;

the first and second radiators form an electrical short therebetween; and the minimum gap is located, along the symmetry axis, between the maximum gap and the electrically short.

23. The antenna of claim 19, wherein:

the half-Vivaldi sub-radiator of the first radiator is further bounded by a third curved edge adjacent to the first curved edge of the first radiator;

the half-Vivaldi sub-radiator of the second radiator is further bounded by a fourth curved edge adjacent to the first curved edge of the second radiator;

the third and fourth curved edges exhibit mirror symmetry about the symmetry axis; and the third and fourth curved edges at least partially form a cavity stub.

24. The antenna of claim 23, the cavity stub being shaped as part of a circle.

25. The antenna of claim 19, wherein:

the tapered slot extends along the symmetry axis between a minimum gap and a maximum gap;

the antenna further comprises a planar reflector that lies perpendicularly to the symmetry axis; and the minimum gap is located, along the symmetry axis, between the maximum gap and the planar reflector.

26. The antenna of claim 25, wherein a distance, parallel to the symmetry axis, between the planar reflector and the curved monopole sub-radiator of each of the first and second radiators is less than or equal to one-fourth of a wavelength of a lower operating frequency of the antenna.

27. A dual-polarization antenna system, comprising:

a first antenna comprising a first instance of the antenna of claim 19; and a second antenna comprising a second instance of the antenna of claim 19;

wherein the dual-polarization antenna system has a common symmetry axis that coincides with the symmetry axis of the first antenna and the symmetry axis of the second antenna.

28. The dual-polarization antenna system of claim 27, wherein:

the first antenna lies in a first plane; and the second antenna lies a second plane that is perpendicular to the first plane.

29. The dual-polarization antenna system of claim 27, wherein:

the tapered slot of the first antenna extends along the common symmetry axis between a first minimum gap and a first maximum gap;

the tapered slot of the second antenna extends along the common symmetry axis between a second minimum gap and a second maximum gap;

the dual-polarization antenna system further comprises a planar reflector that lies perpendicularly to the common symmetry axis; and the first minimum gap is located, along the common symmetry axis, between the first maximum gap and the planar reflector; and the second minimum gap is located, along the common symmetry axis, between the second maximum gap and the planar reflector.

30. The dual-polarization antenna system of claim 27, further comprising a cavity that encircles at least part of the first and second antennas.

31. The dual-polarization antenna system of claim 30, the cavity comprising metal.

32. The dual-polarization antenna system of claim 30, the cavity being shaped as a cylindrical shell.

33. The dual-polarization antenna system of claim 30, further comprising an absorptive material located within the cavity.

34. The dual-polarization antenna system of claim 33, the absorptive material comprising a magnetically absorptive material.

35. The dual-polarization antenna system of claim 27, wherein:

the first antenna comprises electrically conductive material on a first circuit board having a first proximal edge and a first distal edge opposite the first proximal edge, the first proximal edge being closer to a first feed point of the first antenna than the first distal edge;

the first circuit board forms a first slit extending downward from the first distal edge and along the symmetry axis of the first antenna;

the second antenna comprises electrically conductive material on a second circuit board having a second proximal edge and a second distal edge opposite the second proximal edge, the second proximal edge being closer to a second feed point of the second antenna than the second distal edge;

the second circuit board forms a second slit extending upward from the second proximal edge and along the symmetry axis of the second antenna; and the first and second circuit boards intersect via the first and second slits.

36. An antenna radiator, comprising:

a half-Vivaldi sub-radiator that is bounded by:

a first curved edge; and a first straight edge adjacent to the first curved edge, the first straight edge having a first length;

a curved monopole sub-radiator that is co-planar with the half-Vivaldi sub-radiator and bounded by:

a second curved edge;

a second straight edge adjacent to the second curved edge, the second straight edge having a second length that is less than the first length; and a third straight edge adjacent to the second curved edge; and a rectilinear monopole sub-radiator that is co-planar with the half-Vivaldi sub-radiator and the curved monopole sub-radiator, the rectilinear monopole sub-radiator being bounded by a fourth straight edge that at least partially coincides with the third straight edge;

wherein the first and second straight edges coincide such that the first and second curved edges are continuous.

37. The antenna radiator of claim 36, the third and fourth straight edges fully coinciding with each other.

38. The antenna radiator of claim 36, the fourth straight edge being parallel to the second straight edge.

* * * * *